(12) United States Patent
Watanabe

(10) Patent No.: US 12,215,178 B2
(45) Date of Patent: Feb. 4, 2025

(54) HOLLOW PARTICLES

(71) Applicant: ZEON CORPORATION, Tokyo (JP)

(72) Inventor: Masashi Watanabe, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 0 days.

(21) Appl. No.: 18/272,429

(22) PCT Filed: Jan. 25, 2022

(86) PCT No.: PCT/JP2022/002494
§ 371 (c)(1),
(2) Date: Jul. 14, 2023

(87) PCT Pub. No.: WO2022/163600
PCT Pub. Date: Aug. 4, 2022

(65) Prior Publication Data
US 2024/0124634 A1 Apr. 18, 2024

(30) Foreign Application Priority Data
Jan. 29, 2021 (JP) .................. 2021-012841

(51) Int. Cl.
C08F 222/10 (2006.01)
B01J 13/16 (2006.01)
B01J 13/20 (2006.01)
C08F 212/36 (2006.01)

(52) U.S. Cl.
CPC ........... *C08F 222/102* (2020.02); *B01J 13/16* (2013.01); *B01J 13/203* (2013.01); *C08F 212/36* (2013.01);
(Continued)

(58) Field of Classification Search
CPC .................................. B01J 13/16; C08F 2/18
See application file for complete search history.

(56) References Cited

U.S. PATENT DOCUMENTS

2004/0039127 A1* 2/2004 Amou .................... H01B 3/441
524/577
2022/0033628 A1 2/2022 Hirata et al.
(Continued)

FOREIGN PATENT DOCUMENTS

JP 2002-080503 A 3/2002
JP 2004-190038 A 7/2004
(Continued)

OTHER PUBLICATIONS

Machine translation JP 2007-048615 (Year: 2022).*
(Continued)

*Primary Examiner* — Alexandre F Ferre
(74) *Attorney, Agent, or Firm* — WHDA, LLP

(57) ABSTRACT

Hollow particles which comprise a shell containing a resin and a hollow portion surrounded by the shell, wherein a void ratio is 50% or more; wherein a volume average particle diameter is 1.0 μm or more; wherein the shell contains, as the resin, a polymer in which 70 parts by mass to 100 parts by mass of a crosslinkable monomer unit is contained in 100 parts by mass of all monomer units; wherein a thermal expansion coefficient at 80° C. to 200° C. is $10.0 \times 10^{-5}/°$ C. or less; and wherein, in a hollow particle immersion test in which a mixture obtained by adding 0.1 mg of the hollow particles to 4 mL of acetone and shaking them for 10 minutes at a shaking rate of 100 rpm, is left to stand for 48 hours in an environment at 25° C., less than 10% by mass of the hollow particles submerge in the acetone.

7 Claims, 2 Drawing Sheets

(52) U.S. Cl.
CPC ...... *C08F 2800/20* (2013.01); *C08F 2810/20* (2013.01)

(56) References Cited

U.S. PATENT DOCUMENTS

2022/0033652 A1 2/2022 Hirata et al.
2022/0041775 A1* 2/2022 Harada .................... C08F 2/18
2022/0251247 A1 8/2022 Hirata

FOREIGN PATENT DOCUMENTS

| JP | 2007-048615 A | 2/2007 |
| WO | 2004/067638 A1 | 8/2004 |
| WO | 2020/066704 A1 | 4/2020 |
| WO | 2020/066705 A1 | 4/2020 |
| WO | 2020/261926 A1 | 12/2020 |

OTHER PUBLICATIONS

Notification of Transmittal of Traslation of the International Preliminary Report on Patentability (Form PCT/IB/338) issued in counterpart International Application No. PCT/JP2022/002494 mailed Aug. 10, 2023 with Forms PCT/IB/373 and PCT/ISA/237. (5 pages).
Exteneded (Supplementary)European Search Report dated Dec. 13, 2024, issued in counterpart application No. 22745821.3. (10 pages).

* cited by examiner

HOLLOW PARTICLES

TECHNICAL FIELD

The present disclosure relates to hollow particles.

BACKGROUND ART

Hollow particles (hollow resin particles) are particles each of which has a hollow in its interior, and they can scatter light well and can reduce light transmissivity as compared to solid particles in which their interiors are practically filled with resin; hence, hollow particles are widely used in the applications of, for example, aqueous coating materials and paper coating compositions, as organic pigments and masking agents excellent in optical properties such as opacity and whiteness. Also, in recent years, hollow particles are used as weight reducing materials, heat insulation materials or the like for resins and coating materials, which are used in various kinds of fields such as the automotive field, the electronic field, the electric field and the architecture field.

As an electronic material application, for example, on an electronic circuit board, hollow particles may be contained in an insulation resin layer for the purpose of suppressing the occurrence of crosstalk and an increase in transmission loss. On the electronic circuit board, crosstalk and transmission loss can be suppressed by decreasing the relative permittivity and dielectric dissipation factor of the insulation resin layer. Since the interior of the hollow particles is hollow, it has been attempted to decrease the permittivity and dielectric dissipation factor of the insulation resin layer by adding the hollow particles.

An insulation resin layer used in electronic materials is required to have adhesion, dimensional stability and so on when it is used as a lamination material or a sticking material. In electronic materials, an insulation resin layer may be stacked on a metal plate, such as a copper-clad laminate. To increase the adhesion of the insulation resin layer to the metal plate and dimensional stability of the insulation resin layer, it is effective to bring the thermal expansion coefficient (or coefficient of thermal expansion, CTE) of the insulation resin layer close to that of the metal plate. To decrease the CTE of the insulation resin layer, for example, incorporation of an inorganic filler (e.g., silica) into the insulation resin layer has been employed.

However, if the amount of the inorganic filler incorporated in the insulation resin layer is increased, a deterioration in physical properties occurs (e.g., cracking is likely to occur), and there is a problem in that a sufficient decrease in relative permittivity and dielectric dissipation factor cannot be achieved.

Meanwhile, the CTE of hollow particles is generally low compared to that of an insulation resin. Accordingly, by incorporating hollow particles in an insulation resin layer, not only a decrease in permittivity and dielectric dissipation factor, but also a decrease in CTE is expected to be achieved.

Patent Literatures 1 and 2 disclose a technique of adding hollow particles to a resin composition for electronic material applications, for the purpose of decreasing permittivity and dielectric loss tangent, for example.

Patent Literature 1 discloses hollow particles obtained by suspending a solution, which is obtained by mixing divinylbenzene, an initiator and hexadecane with an aqueous solution in which polyvinyl alcohol is dissolved, and then subjecting the solution to a suspension polymerization. Patent Literature 1 also discloses that the thermal expansion coefficient of a copper-clad laminate using a resin composition containing the hollow particles decreases.

Patent Literature 2 discloses hollow particles obtained by adding an oil component, which is obtained by mixing an epoxy skeleton component with an organic solvent, to an aqueous solution containing a curing agent and a water-soluble emulsifier, emulsifying the mixed solution, and then subjecting the solution to an interfacial polymerization. Patent Literature 2 also discloses that generation of wrinkles or warpage of a material containing the hollow particles at around a glass transition temperature of the hollow particles is suppressed when the ratio of average linear expansion coefficient $\alpha_2$ at a temperature 10° C. to 50° C. higher than the glass transition temperature to average linear expansion coefficient $\alpha_1$ at a temperature 10° C. to 50° C. lower than the glass transition temperature, is 3 or less.

CITATION LIST

Patent Literatures

Patent Literature 1: International Publication No. WO2004/067638
Patent Literature 2: Japanese Patent Application Laid-Open (JP-A) No. 2007-48615

SUMMARY OF INVENTION

Technical Problem

However, a further decrease in thermal expansion coefficient of hollow particles for electronic material applications and so on, is required.

An object of the present disclosure is to provide hollow particles having a decreased thermal expansion coefficient.

Solution to Problem

The inventor of the present disclosure focused on the polar solvent permeability of the shell of the hollow particles, and he found that hollow particles that acetone is prevented from easily permeating the shell by adjusting, for example, the composition and production method of the shell, have a low thermal expansion coefficient.

The hollow particles of the present disclosure are hollow particles which comprise a shell containing a resin and a hollow portion surrounded by the shell, wherein a void ratio is 50% or more;

wherein a volume average particle diameter is 1.0 μm or more;

wherein the shell contains, as the resin, a polymer in which from 70 parts by mass to 100 parts by mass of a crosslinkable monomer unit is contained in 100 parts by mass of all monomer units;

wherein a thermal expansion coefficient at 80° C. to 200° C. is $10.0 \times 10^{-5}$/° C. or less; and wherein, in a hollow particle immersion test in which a mixture obtained by adding 0.1 mg of the hollow particles to 4 mL of acetone and shaking them for 10 minutes at a shaking rate of 100 rpm, is left to stand for 48 hours in an environment at 25° C., less than 10% by mass of the hollow particles submerge in the acetone.

In the hollow particles of the present disclosure, a thermal expansion coefficient at 25° C. to 80° C. can be $6.0 \times 10^{-5}$/° C. or less.

In the hollow particles of the present disclosure, a relative permittivity at a frequency of 1 GHz can be 1.6 or less.

In the hollow particles of the present disclosure, a dielectric dissipation factor at a frequency of 1 GHz can be 0.010 or less.

In the hollow particles of the present disclosure, the polymer contained in the shell may contain, as the crosslinkable monomer unit, a bifunctional crosslinkable monomer unit derived from a bifunctional crosslinkable monomer, and a content of the bifunctional crosslinkable monomer unit in 100 parts by mass of all monomer units of the polymer, may be from 70 parts by mass to 100 parts by mass.

In the hollow particles of the present disclosure, the polymer contained in the shell may contain, as the crosslinkable monomer unit, a trifunctional or higher-functional crosslinkable monomer unit derived from a trifunctional or higher-functional crosslinkable monomer, and a content of the trifunctional or higher-functional crosslinkable monomer unit in 100 parts by mass of all monomer units of the polymer, may be from 5 parts by mass to 50 parts by mass.

In the hollow particles of the present disclosure, the polymer contained in the shell further may further contain a hydrophilic non-crosslinkable monomer unit derived from a hydrophilic non-crosslinkable monomer having a solubility of 0.3 g/L or more in distilled water at 20° C., and in 100 parts by mass of all monomer units of the polymer, a content of the hydrophilic non-crosslinkable monomer unit is from 2 parts by mass to 15 parts by mass, and a content of the crosslinkable monomer unit may be from 70 parts by mass to 98 parts by mass.

In the hollow particles of the present disclosure, the crosslinkable monomer unit may contain a crosslinkable monomer derived from a (meth)acrylic crosslinkable monomer containing, as a polymerizable functional group, a (meth)acryloyl group.

Advantageous Effects of Invention

According to the present disclosure as described above, hollow particles having a decreased thermal expansion coefficient are provided.

BRIEF DESCRIPTION OF DRAWINGS

In the accompanying drawings.

DESCRIPTION OF EMBODIMENTS

Figure 1:
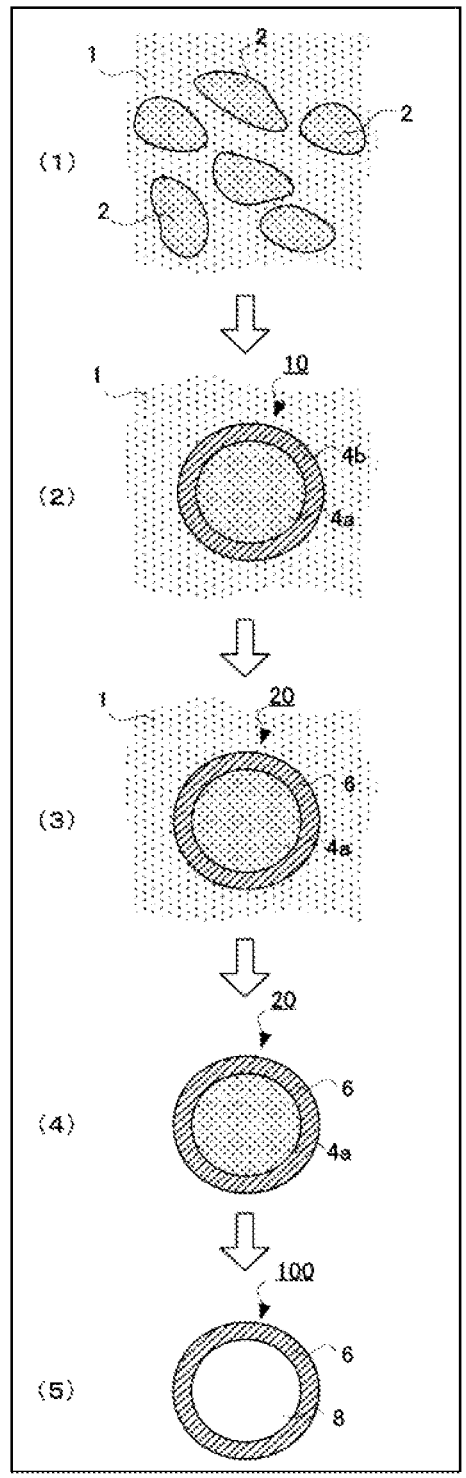
FIG. 1 is a diagram illustrating an example of the method for producing the hollow particles of the present disclosure.

In the present disclosure, "A to B" in a numerical range is used to describe a range in which the numerical value A is included as the lower limit value and the numerical value B is included as the upper limit value.

Also in the present disclosure, (meth)acrylate means each of acrylate and methacrylate; (meth)acryl means each of acryl and methacryl; and (meth)acryloyl means each of acryloyl and methacryloyl.

Also in the present disclosure, the term "polymerizable monomer" means a compound having an addition-polymerizable functional group (in the present disclosure, it may be simply referred to as a "polymerizable functional group"). Also in the present disclosure, as the polymerizable monomer, a compound having an ethylenically unsaturated bond as the addition-polymerizable functional group, is generally used.

There are two kinds of polymerizable monomers: a non-crosslinkable monomer and a crosslinkable monomer. The non-crosslinkable monomer is a polymerizable monomer which has only one polymerizable functional group, and the crosslinkable monomer is a polymerizable monomer which has two or more polymerizable functional groups and which forms crosslinking in resin by a polymerization reaction.

Also in the present disclosure, the polymerizable monomer having a solubility of 0.3 g/L or more in distilled water at 20° C., is referred to as "hydrophilic monomer", and the polymerizable monomer having a solubility of less than 0.3 g/L in distilled water at 20° C., is referred to as "non-hydrophilic monomer".

1. Hollow Particles

The hollow particles of the present disclosure are hollow particles which comprise a shell containing a resin and a hollow portion surrounded by the shell,
  wherein a void ratio is 50% or more;
  wherein a volume average particle diameter is 1.0 μm or more;
  wherein the shell contains, as the resin, a polymer in which from 70 parts by mass to 100 parts by mass of a crosslinkable monomer unit is contained in 100 parts by mass of all monomer units;
  wherein a thermal expansion coefficient at 80° C. to 200° C. is $10.0 \times 10^{-5}$/° C. or less; and
  wherein, in a hollow particle immersion test in which a mixture obtained by adding 0.1 mg of the hollow particles to 4 mL of acetone and shaking them for 10 minutes at a shaking rate of 100 rpm, is left to stand for 48 hours in an environment at 25° C., less than 10% by mass of the hollow particles submerge in the acetone.

The hollow particles of the present disclosure are particles which comprise a resin-containing shell (outer shell) and a hollow portion surrounded by the shell.

In the present disclosure, the term "hollow portion" means a hollow space clearly distinguished from the shell of hollow particles formed from a resin material. The shell of the hollow particles may have a porous structure. In this case, the hollow portion has a size that is clearly distinguishable from many minute spaces uniformly dispersed in the porous structure.

The hollow portion of the hollow particles can be determined by, for example, SEM observation of a cross section of the particles or TEM observation of the particles as they are.

From the viewpoint of obtaining a low permittivity and a low dielectric dissipation factor, the hollow portion of the hollow particles of the present disclosure is preferably filled with gas such as air or nitrogen, or it is preferably in a reduced pressure state close to vacuum.

Hollow particles have a hollow portion in the interior of the particles. Accordingly, they can impart performances such as weight reduction, thermal insulation and low permittivity to various kinds of compositions, molded bodies and the like mixed with hollow particles. Since hollow particles of the present disclosure are particles having a decreased thermal expansion coefficient (CTE), the CTE of various kinds of compositions, molded bodies and the like mixed with the hollow particles of the present disclosure, can be further decreased.

In the hollow particles of the present disclosure, the polymer contained in the shell contains from 70 parts by mass to 100 parts by mass of a crosslinkable monomer unit in 100 parts by mass of all monomer units. Accordingly, the content of the crosslinkable monomer unit in the shell of the hollow particles is large, and it is presumed that the covalent bond network is more tightly strung in the shell. Also, less than 10% by mass of the hollow particles of the present disclosure submerge in the acetone in the hollow particle immersion test. Accordingly, the hollow particles have such a dense structure, that acetone is less likely to permeate the shell. In the hollow particles of the present disclosure, accordingly, it is presumed that the crosslinked structure of the shell is more densified. The reason for the low CTE of the hollow particles of the present disclosure, is presumed as follows: the void ratio is 50% or more, and the percentage of the hollow portion in the particles is sufficiently large, that is, the percentage of the shell in the particles is sufficiently small; in addition, since the shell has the dense structure, the hollow particles have excellent heat resistance, and they are less likely to cause a change in size by heat.

The hollow particles of the present disclosure are particles having a decreased relative permittivity and a decreased dielectric dissipation factor. The reason for the excellent dielectric properties of the hollow particles of the present disclosure, is presumed as follows: the void ratio of the hollow particles of the present disclosure is 50% or more, that is, the percentage of the hollow portion in the particles is sufficiently large; in addition, since the shell has a dense structure, molecular motion is remarkably limited, and dielectric relaxation is less likely to occur. In addition, due to their excellent shell strength, the hollow particles of the present disclosure are less likely to deform or collapse, and an increase in the relative permittivity by the deformation or collapse of the hollow particles, is suppressed. Accordingly, it is though that the hollow particles of the present disclosure can maintain low permittivity.

The hollow particles of the present disclosure are particles having a decreased thermal expansion coefficient (CTE).

For the hollow particles of the present disclosure, the thermal expansion coefficient at 80° C. to 200° C. is $10.0 \times 10^{-5}$/° C. or less. In a preferred embodiment, it can be $9.9 \times 10^{-5}$/° C. or less, or it can be $9.8 \times 10^{-5}$/° C. or less. The lower limit of the thermal expansion coefficient at 80° C. to 200° C. is not particularly limited, and it is generally $5.0 \times 10^{-5}$/° C. or more.

For the hollow particles of the present disclosure, the thermal expansion coefficient at 25° C. to 80° C. can be $6.0 \times 10^{-5}$/° C. or less. In a more preferred embodiment, it can be $5.9 \times 10^{-5}$/° C. or less, or it can be $5.8 \times 10^{-5}$/° C. or less. The lower limit of the thermal expansion coefficient at 25° C. to 80° C. is not particularly limited, and it is generally $1.0 \times 10^{-5}$/° C. or more.

In the present disclosure, the thermal expansion coefficient $\alpha_p$ of the hollow particles can be obtained by the following formula (E):

$$\alpha_p = (\alpha_c - SG_r \times \alpha_r)/W_p \quad \text{Formula (E)}$$

(where $\alpha_c$ is the thermal expansion coefficient of a molded plate of the resin composition comprising the matrix resin and the hollow particles; $\alpha_r$ is the thermal expansion coefficient of the matrix resin alone; $SG_r$ is the volume ratio of the matrix resin of the molded plate; and $W_p$ is the volume ratio of the hollow particles in the molded plate.)

In accordance with JIS K7197:2012, the thermal expansion coefficient is measured in a predetermined temperature range.

As the matrix resin, for example, epoxy resin is used. The matrix resin may contain an additive for curing resin, such as a curing agent and a curing catalyst.

The hollow particles of the present disclosure are particles having a decreased relative permittivity and a decreased dielectric dissipation factor.

In the present disclosure, the relative permittivity of the hollow particles at a frequency of 1 GHz can be 1.6 or less. In a more preferred embodiment, it can be 1.5 or less. The lower limit of the relative permittivity of the hollow particles of the present disclosure is not particularly limited, and it is generally 1.0 or more.

Also in the present disclosure, the dielectric dissipation factor of the hollow particles at a frequency of 1 GHz can be 0.010 or less. In a more preferred embodiment, it can be 0.009 or less. The lower limit of the dielectric dissipation factor of the hollow particles of the present disclosure is not particularly limited, and it is generally 0.001 or more.

In the present disclosure, the relative permittivity and dielectric dissipation factor of the hollow particles are measured by use of a perturbation-type measuring device, at a measurement frequency of 1 GHz.

The void ratio of the hollow particles of the present disclosure is 50% or more, and preferably 60% or more. When the void ratio is equal to or more than the lower limit value, the hollow particles are low in CTE, relative permittivity and dielectric dissipation factor, and they are excellent in lightweight, heat resistance and heat insulation properties. The upper limit of the void ratio of the hollow particles of the present disclosure is not particularly limited. From the viewpoint of suppressing a decrease in the strength of the hollow particles and making the hollow particles less likely to collapse, the upper limit is preferably 90% or less, more preferably 85% or less, and still more preferably 80% or less.

The void ratio of the hollow particles of the present disclosure is calculated from the apparent density $D_1$ and true density $D_0$ of the hollow particles.

A method for measuring the apparent density $D_1$ of the hollow particles is as follows. First, approximately 30 cm$^3$ of the hollow particles are introduced into a measuring flask with a volume of 100 cm$^3$, and the mass of the introduced hollow particles is precisely weighed. Next, the measuring flask in which the hollow particles are introduced, is precisely filled with isopropanol up to the marked line while care is taken so that air bubbles do not get in. The mass of the isopropanol added to the measuring flask is precisely weighed, and the apparent density $D_1$ (g/cm$^3$) of the hollow particles is calculated by the following formula (I).

Apparent density $D_1$=[Mass of the hollow particles]/
(100−[Mass of the isopropanol]/[Specific gravity of the isopropanol at the measuring temperature])      Formula (I)

The apparent density $D_1$ is equivalent to the specific gravity of the whole hollow particle in the case where the hollow portion is regarded as a part of the hollow particle.

A method for measuring the true density $D_0$ of the hollow particles is as follows. The hollow particles are pulverized in advance; approximately 10 g of the pulverized hollow particles are introduced into a measuring flask with a volume of 100 cm$^3$; and the mass of the introduced pulverized particles is precisely weighed. After that, similarly to the measurement of the apparent density mentioned above, isopropanol is added to the measuring flask; the mass of the isopropanol is precisely weighed; and the true density $D_0$ (g/cm³) of the hollow particles is calculated by the following formula (II).

True density $D_1$=[Mass of the pulverized hollow particles]/(100−[Mass of the isopropanol]/[Specific gravity of the isopropanol at the measuring temperature])    Formula (II)

The true density $D_1$ is equivalent to the specific gravity of the shell portion alone of the hollow particle. As is clear from the measurement method mentioned above, when calculating the true density Do, the hollow portion is not regarded as a part of the hollow particle.

The void ratio (%) of the hollow particles is calculated by the following formula (III) from the apparent density $D_1$ and the true density $D_1$.

Void ratio (%)=100−(Apparent density $D_1$/True density $D_0$)×100    Formula (III)

The volume average particle diameter of the hollow particles of the present disclosure is 1.0 µm or more. Since the volume average particle diameter of the hollow particles is equal to or more than the lower limit value, the aggregability of the hollow particles decreases, and the hollow particles exert excellent dispersibility, accordingly. In addition, since the hollow particles are less likely to cause a wiring failure even if they are incorporated in the insulation resin layer or the like of an electronic circuit board. Accordingly, the hollow particles are preferably used as a material for electronic circuit boards.

In the present disclosure, the lower limit of the volume average particle diameter of the hollow particles is preferably 3.0 µm or more, more preferably 5.0 µm or more, and still more preferably 7.0 µm or more. In the present disclosure, the upper limit of the volume average particle diameter of the hollow particles is not particularly limited, and it is preferably 30.0 µm or less, more preferably 20.0 µm or less, and still more preferably 15.0 µm or less, from the following viewpoints: the strength of the hollow particles is increased; the shell thickness is likely to be uniform; and the hollow particles can be easily used as a material for electronic circuit boards.

To control the volume average particle diameter of the hollow particles within the above-mentioned preferred range, for example, it is preferable to use the above-mentioned preferred dispersion stabilizer, and it is also preferable to use the above-mentioned preferred hydrophobic solvent.

The particle size distribution (volume average particle diameter (Dv)/number average particle diameter (Dn)) of the hollow particles may be 1.1 or more and 2.5 or less, for example. When the particle size distribution is 2.5 or less, hollow particles such that compressive strength and heat resistance slightly vary between the hollow particles, can be obtained. When the particle size distribution is 2.5 or less, a product having uniform thickness can be produced in the case of producing a molded body in a sheet form, for example.

The volume average particle diameter (Dv) and number average particle diameter (Dn) of the hollow particles can be found as follows, for example. The particle diameter of each of the hollow particles is measured with a laser diffraction particle size distribution measuring apparatus; the number average and volume average of the particle diameters are calculated; and the obtained values can be used as the number average particle diameter (Dn) and volume average particle diameter (Dv) of the hollow particles. The particle size distribution is found by dividing the volume average particle diameter by the number average particle diameter.

For the shell thickness of the hollow particles of the present disclosure, from the viewpoint of increasing the strength of the hollow particles, the lower limit is preferably 0.1 µm or more, more preferably 0.3 µm or more, and still more preferably 0.5 µm or more; moreover, from the viewpoint of increasing the void ratio, the upper limit is preferably 6 µm or less, more preferably 4 µm or less, still more preferably 2 µm or less, and even more preferably 1 µm or less. When the thickness of the shell of the hollow particles is equal to or more than the lower limit value, the strength of the shell increases. Meanwhile, the shell of the hollow particles of the present disclosure has such a dense structure, that acetone is less likely to permeate. Accordingly, the hollow particles are excellent in strength and less likely to collapse even when the shell thickness is equal to or less than the upper limit value and is thin.

The thickness of the shell of the hollow particles can be calculated as follows. The inner diameter r is calculated by the following formula (1) using the volume average particle diameter R and void ratio of the hollow particles, and the thickness of the shell is calculated by the following formula (2) using the inner diameter r and the volume average particle diameter R. The void ratio in the following formula (1) is a numerical value when expressed in a ratio.

$4/3\pi \times (R/2)^3 \times$Void ratio=$4/3\pi \times (r/2)^3$    Formula (1)

Shell thickness=$(R-r)/2$    Formula (2)

The difference between the shell thickness calculated as described above and the average value of the actually measured thicknesses of 20 points of the shell, is generally within ±10% of the average value of them. Accordingly, the thickness of the shell calculated as described above can be considered as the thickness of the shell of the hollow particles.

The thickness of each point of the shell of the hollow particles, which is used to obtain the average value of the thicknesses of 20 points of the shell, can be measured by SEM observation of shell fragments obtained by breaking the hollow particles, for example.

The shape of the hollow particles of the present disclosure is not particularly limited, as long as the hollow portion is formed in the interior. As the shape, examples include, but are not limited to, a spherical shape, an ellipsoidal shape and an irregular shape. Among them, a spherical shape is preferable in terms of ease of production.

The hollow particles may have one or two or more hollow portions. The shell of the hollow particles and, when the hollow particles have two or more hollow portions, a partition separating the adjacent hollow portions from each other may be porous. The interior of the particles preferably has only one hollow portion in order to maintain good balance between the high void ratio of the hollow particles and the mechanical strength of the hollow particles.

The average circularity of the hollow particles may be from 0.950 to 0.995.

An example of the image of the shape of the hollow particles is a bag made of a thin film and inflated with gas. A cross-section of the bag is like the hollow particle 100 shown in the diagram (5) of FIG. 1 described below. In this example, one thin film is provided on the outside, and the interior is filled with the gas.

The shape of the particles can be determined by SEM or TEM, for example. Further, the shape of the interior of the particles can be determined by SEM or TEM after cutting the particles into round slices by a known method.

The shell of the hollow particles of the present disclosure contains, as the resin, a polymer in which from 70 parts by mass to 100 parts by mass of a crosslinkable monomer unit is contained in 100 parts by mass of all monomer units. The polymer forms the framework of the shell of the hollow particles. Since the shell contains the crosslinkable monomer unit in the above amount, the covalent bond network is tightly strung in the shell of the hollow particles of the present disclosure.

In the polymer, the content of the crosslinkable monomer unit in 100 parts by mass of all monomer units, is preferably 75 parts by mass or more, and more preferably 85 parts by mass or more, from the viewpoint of decreasing the CTE, relative permittivity and dielectric dissipation factor of the hollow particles and increasing the strength of the hollow particles. On the other hand, when the hydrophilic non-crosslinkable monomer is added as the second polymerizable monomer, the content of the crosslinkable monomer unit is preferably 98 parts by mass or less, and more preferably 97 parts by mass or less, from the viewpoint of adding a sufficient amount of the second polymerizable monomer.

In the present disclosure, the crosslinkable monomer unit is a monomer unit derived from the crosslinkable monomer. In the polymer, when the content of the crosslinkable monomer unit is less than 100 parts by mass, the monomer unit other than the crosslinkable monomer unit is a non-crosslinkable monomer unit derived from the non-crosslinkable monomer.

The polymer is typically a polymer of the first and second polymerizable monomers obtained by the first and second polymerization reactions in the below-described method for producing the hollow particles of the present disclosure. That is, in the hollow particles of the present disclosure, the crosslinkable and non-crosslinkable monomer units contained in the polymer generally originate from the first and second polymerizable monomers described below.

The specific details of the crosslinkable and non-crosslinkable monomers used for synthesis of the polymer are as described below in the method for producing the hollow particles of the present disclosure.

As the crosslinkable monomer unit, the polymer contains at least one selected from a bifunctional crosslinkable monomer unit derived from a bifunctional crosslinkable monomer and a trifunctional or higher-functional crosslinkable monomer unit derived from a trifunctional or higher-functional crosslinkable monomer. From the viewpoint of decreasing the CTE of the hollow particles and increasing the strength of the hollow particles, the polymer preferably contains at least the bifunctional crosslinkable monomer unit. From the viewpoint of further increasing the strength of the hollow particles, the polymer more preferably contains the bifunctional crosslinkable monomer unit in combination with the trifunctional or higher-functional crosslinkable monomer unit.

In the present disclosure, the crosslinkable monomer unit derived from a bifunctional crosslinkable monomer may be referred to as a "bifunctional crosslinkable monomer unit", and the crosslinkable monomer unit derived from a trifunctional or higher-functional crosslinkable monomer may be referred to as a "trifunctional or higher-functional crosslinkable monomer unit".

When the polymer contains the bifunctional crosslinkable monomer unit, the content of the bifunctional crosslinkable monomer unit in 100 parts by mass of all monomer units of the polymer, is not particularly limited. The lower limit is preferably 70 parts by mass or more, and more preferably 75 parts by mass or more, from the viewpoint of decreasing the CTE of the hollow particles and increasing the strength of the hollow particles. On the other hand, the upper limit may be 100 parts by mass or less. From the viewpoint of sufficiently containing the trifunctional or higher-functional crosslinkable monomer unit or the below-described hydrophilic non-crosslinkable monomer unit, the upper limit is preferably 98 parts by mass or less, more preferably 95 parts by mass or less, and still more preferably 90 parts by mass or less.

When the polymer contains the trifunctional or higher-functional crosslinkable monomer unit, the content of the trifunctional or higher-functional crosslinkable monomer unit in 100 parts by mass of all monomer units of the polymer, is not particularly limited. The lower limit is preferably 5 parts by mass or more, more preferably 10 parts by mass or more, and still more preferably 15 parts by mass or more, from the viewpoint of decreasing the CTE of the hollow particles and increasing the strength of the hollow particles. On the other hand, the upper limit is preferably 50 parts by mass or less, and more preferably 40 parts by mass or less. From the viewpoint of sufficiently containing the bifunctional or higher-functional crosslinkable monomer unit or the below-described hydrophilic non-crosslinkable monomer unit, the upper limit is still more preferably 30 parts by mass or less, and even more preferably 25 parts by mass or less.

The crosslinkable monomer unit contained in the polymer may contain a crosslinkable monomer unit derived from a (meth)acrylic crosslinkable monomer containing, as a polymerizable functional group, a (meth)acryloyl group. Accordingly, the hollow particles of the present disclosure are excellent in strength and heat resistance, and the adhesion of the resin composition mixed with the hollow particles of the present disclosure is increased.

When the polymer contains a crosslinkable monomer unit derived from a (meth)acrylic crosslinkable monomer, the content of the crosslinkable monomer unit derived from a (meth)acrylic crosslinkable monomer is, in 100 parts by mass of the crosslinkable monomer unit, preferably 50 parts by mass or more, more preferably 70 parts by mass or more, and still more preferably 90 parts by mass or more, or the crosslinkable monomer unit may be composed of a (meth)acrylic crosslinkable monomer unit.

The specific details of the (meth)acrylic crosslinkable monomer are as described below in the method for producing the hollow particles of the present disclosure.

The polymer preferably further contains a non-crosslinkable monomer unit; the polymer more preferably contains the hydrophilic non-crosslinkable monomer unit having a solubility of 0.3 g/L or more in distilled water at 20° C.; and the polymer particularly preferably contains a hydrophilic non-crosslinkable monomer unit derived from the second polymerizable monomer described below. When the polymer contains the crosslinkable monomer unit in combination with the non-crosslinkable monomer unit, the mechanical properties of the shell of the hollow particles improve. Especially when the polymer contains the hydrophilic non-crosslinkable monomer unit as the non-crosslinkable monomer unit, the structure of the shell is likely to be dense. Accordingly, the CTE, relative permittivity and dielectric dissipation factor of the hollow particles are likely to decrease, and the strength of the hollow particles is likely to increases.

In 100 parts by mass of all monomer units of the polymer, the content of the non-crosslinkable monomer unit is from 0 parts by mass to 30 parts by mass. From the viewpoint of increasing the strength of the hollow particles, it is preferably from 2 parts by mass to 25 parts by mass, and more preferably from 4 parts by mass to 15 parts by mass.

In 100 parts by mass of all monomer units of the polymer, the content of the hydrophilic non-crosslinkable monomer unit is from 2 parts by mass to 15 parts by mass, more preferably from 3 parts by mass to 13 parts by mass, and still more preferably from 4 parts by mass to 10 parts by mass, from the viewpoint of increasing the strength of the hollow particles and decreasing the CTE, relative permittivity and dielectric dissipation factor of the hollow particles.

In 100% by mass of all the solid content of the shell of the hollow particles of the present disclosure, the content of the polymer is preferably 90% by mass or more, and more preferably 95% by mass or more. By controlling the content of the polymer to equal to or more than the lower limit value, the strength of the hollow particles is increased.

The shell of the hollow particles of the present disclosure may further contain a polar component. As the polar component, examples include, but are not limited to, an organic acid, a metal salt thereof, and a polar resin.

The specific details of the polar component are as described below in the method for producing the hollow particles of the present disclosure.

The presence and content of the polar component in the shell of the hollow particles, can be confirmed by pyrolysis-gas chromatography, for example.

When the shell of the hollow particles of the present disclosure contains an organic acid or a metal salt thereof as the polar component, the total content of the organic acid and metal salt thereof in the shell is preferably from 0.0001% by mass to 0.1% by mass, and more preferably from 0.001% by mass to 0.01% by mass.

On the other hand, when the shell of the hollow particles of the present disclosure contains a polar resin as the polar component, the content of the polar resin in the shell is preferably from 0.1% by mass to 10.0% by mass, and more preferably from 0.3% by mass to 8.0% by mass.

When the shell contains the organic acid, the metal salt thereof or the polar resin, a decrease in the strength of the shell is suppressed, and a collapse of the hollow particles is further suppressed.

In the hollow particle immersion test in which the mixture obtained by adding 0.1 mg of the hollow particles of the present disclosure to 4 mL of acetone and shaking them for 10 minutes at a shaking rate of 100 rpm, is left to stand for 48 hours in the environment at 25° C., less than 10% by mass of the hollow particles submerge in the acetone. The amount of the hollow particles submerging in the acetone in the immersion test, serves as an index of the density of the shell of the hollow particles. It is presumed that as the amount of the hollow particles submerging in the acetone in the immersion test decreases, the density of the shell of the hollow particles increases. It is also presumed that as the density of the shell of the hollow particles increases, the CTE, relative permittivity and dielectric dissipation factor of the hollow particles tend to decrease.

For the hollow particles of the present disclosure, the amount of the hollow particles submerging in the acetone in the immersion test is required to be less than 10% by mass, and it is more preferably less than 5% by mass.

In the case of the hollow particles having a void ratio of 50% or more, for the purpose of controlling the hollow particles submerging in the acetone in the immersion test to less than 10% by mass, the hollow particles may be produced by the following method so that the content of the crosslinkable monomer unit in the shell-forming polymer is 70% by mass or more: during the polymerization reaction of the suspension, when the polymerization conversion rate of the first polymerizable monomer containing a specific amount or more of the crosslinkable monomer reaches 93% by mass or more, the second polymerizable monomer, which is a hydrophilic monomer, is added to the suspension, and the suspension is further subjected to a polymerization reaction. This production method is the below-described method for producing the hollow particles of the present disclosure.

In SEM observation of the hollow particles of the present disclosure, the number of the hollow particles having a communication hole or shell defect is preferably 5 or less per 100 of the hollow particles.

In general, there are hollow particles in which the shell does not have a communication hole communicating between the hollow portion and the external space of the particles, and hollow particles in which the shell has one or two or more communication holes and the hollow portion communicates with the outside of the particles via the communication holes. In general, depending on the size of the hollow particles, the diameter of the communication hole is approximately from 10 nm to 500 nm. While the communication hole imparts beneficial functions to the hollow particles, since the communication hole is a defect portion of the shell, it decreases the strength of the hollow particles and causes the collapse of the hollow particles.

Also, the hollow particles may have a crack-shaped shell defect which is extremely large relative to the size of the hollow particles. In general, depending on the size of the hollow particles, a crack having a length of 1 μm or more extremely deteriorates the strength of hollow particles. Accordingly, it is recognized as a shell defect.

In the hollow particle immersion test, when less than 10% by mass of the hollow particles submerge in the acetone, the number of the hollow particles having a communication hole or shell defect can be considered to be 5 or less per 100 of the hollow particles. Even when the shell does not have a communication hole or a shell defect, there is a possibility that 10% by mass or more of the hollow particles submerge in the hollow particle immersion test. Accordingly, the case where less than 10% by mass of the hollow particles submerge in the hollow particle immersion test, is considered to mean that the communication holes and shell defects of the shell are very few, and the shell has a dense cross-linked structure.

2. Method for Producing Hollow Particles

For example, the hollow particles of the present disclosure can be obtained by a hollow particle production method comprising:
preparing a mixture liquid containing a hydrocarbon solvent, a dispersion stabilizer, an aqueous medium, and a first polymerizable monomer containing a crosslinkable monomer,
suspending the mixture liquid to prepare a suspension in which droplets of a monomer composition containing the first polymerizable monomer and the hydrocarbon solvent are dispersed in the aqueous medium, and
subjecting the suspension to a polymerization reaction, and
wherein, during the polymerization reaction of the suspension, when a polymerization conversion rate of the first polymerizable monomer reaches 93% by mass or more, a second polymerizable monomer having a solubility of 0.3 g/L or more in distilled water at 20° C., is added to the suspension and further subjected to a polymerization reaction.

The above-mentioned method for producing the hollow particles follows the following basic technique: by carrying out the suspension treatment of the mixture liquid containing the first polymerizable monomer, the hydrocarbon solvent, the dispersion stabilizer, and the aqueous medium, phase separation is caused between the first polymerizable monomer and the hydrocarbon solvent. Accordingly, the suspension in which droplets are dispersed in the aqueous medium, and the droplets having a distribution structure such that the first polymerizable monomer is distributed on the surface side and the hydrocarbon solvent is distributed in the center, is prepared. By subjecting the suspension to a polymerization reaction, the surface of the droplets is cured to form the hollow particles having the hollow portion filled with the hydrocarbon solvent.

According to this basic technique, during the polymerization reaction of the suspension, when the polymerization conversion rate of the first polymerizable monomer containing the crosslinkable monomer reaches 93% by mass or more, the second polymerizable monomer, which is a hydrophilic monomer having a solubility that is equal to or more than the above-specified value in distilled water at 20° C., is added to the suspension, and the suspension is further subjected to a polymerization reaction. Accordingly, such hollow particles are produced, that less than 10% by mass of the hollow particles submerge in the acetone in the hollow particle immersion test. When the crosslinkable monomer is used as a polymerizable monomer that is used to form the shell of the hollow particles, unreacted polymerizable functional groups are likely to remain in the shell. As the number of the polymerizable functional groups remaining unreacted in the shell increases, the crosslinked structure of the shell becomes looser. Accordingly, it is presumed that because the unreacted polymerizable functional groups remain in the hollow particles obtained by the conventional production method, 10% by mass or more of the hollow particles submerge in the acetone in the hollow particle immersion test.

In the above-mentioned method for producing the hollow particles, the reaction rate of the whole polymerizable monomers including the first and second polymerizable monomers, is considered to be increased by the following polymerization reaction of the suspension: the suspension in which the droplets of the monomer composition containing the first polymerizable monomer are dispersed in the aqueous medium, the first polymerizable monomer containing a large amount of the crosslinkable monomer, is subjected to the first polymerization reaction until the polymerization conversion rate of the first polymerizable monomer reaches 93% by mass or more; then, the second polymerizable monomer which is a hydrophilic monomer, is added to the suspension; and the suspension is further subjected to the second polymerization reaction.

In the present disclosure, the particles having the hollow portion filled with the hydrocarbon solvent and the shell containing the polymer of the first polymerizable monomer obtained by the first polymerization reaction, may be referred to as the "first precursor particles", and the composition containing the first precursor particles may be referred to as the "first precursor composition". Also in the present disclosure, the particles having the hollow portion filled with the hydrocarbon solvent and the shell containing the polymer of the first and second polymerizable monomers, may be considered as the intermediate of the hollow particles in which the hollow portion is filled with gas, and they may be referred to as the "second precursor particles". The composition containing the second precursor particles may be referred to as the "second precursor composition".

In the method for producing the hollow particles, the second polymerizable monomer is likely to be incorporated into the shell of the first precursor particles when added to the first precursor composition, because the solubility of the second polymerizable monomer in distilled water at 20° C. is equal to or more than the above-specified value. The second polymerizable monomer is considered to be incorporated into the shell formed by the first polymerizable monomer and accelerate the thermal motion of the shell when added to the first precursor composition, because the second polymerizable monomer is a hydrophilic monomer and has affinity for both the first polymerizable monomer and the aqueous medium. The reason for the formation of the shell such that acetone is less likely to permeate, is presumed as follows. In the second polymerization reaction, the polymerization reaction progresses while the thermal motion of the shell is accelerated in the state where the second polymerizable monomer is incorporated in the shell formed by the first polymerizable monomer. Accordingly, the reaction rate is high; the polymerization reaction of the second polymerizable monomer incorporated in the shell and the polymerizable functional groups of the first polymerizable monomer remaining unreacted in the shell, sufficiently progress; and the crosslinked structure is densified.

The method for producing the hollow particles includes the steps of preparing the mixture liquid, preparing the suspension, and subjecting the suspension to the polymerization reaction. The method may further include other steps. As far as technically possible, two or more of the above steps and other additional steps may be simultaneously carried out as one step, or their order may be changed and then they may be carried out in that order. For example, the preparation and suspension of the mixture liquid may be simultaneously carried out in one step (e.g., the mixture liquid may be suspended while adding the materials for the mixture liquid).

A preferred embodiment of the method for producing the hollow particles may be a production method including the following steps.

(1) Mixture Liquid Preparation Step

The mixture liquid preparation step includes preparing the mixture liquid containing the first polymerizable monomer, the hydrocarbon solvent, the dispersion stabilizer, and the aqueous medium.

(2) Suspension Step

The suspension step includes suspending the mixture liquid to prepare the suspension in which the droplets of the monomer composition containing the first polymerizable monomer and the hydrocarbon solvent are dispersed in the aqueous medium.

(3) Polymerization Step (3-1) First Polymerization Step

The first polymerization step includes performing the first polymerization reaction by subjecting the suspension to a polymerization reaction, until the polymerization conversion rate of the first polymerizable monomer reaches 93% by mass or more to prepare the first precursor composition containing the first precursor particles that have the shell containing the polymer of the first polymerizable monomer and the hollow portion filled with the hydrocarbon solvent.

(3-2) Second Polymerization Step

The second polymerization step includes performing the second polymerization reaction by adding, to the first precursor composition, the second polymerizable monomer having a solubility of 0.3 g/L or more in distilled water at 20° C. and subjecting the composition to the polymerization reaction to prepare the second precursor composition containing the second precursor particles that have the shell containing the polymer of the first and second polymerizable monomers and the hollow portion filled with the hydrocarbon solvent.

(4) Solid-Liquid Separation Step

The solid-liquid separation step includes carrying out solid-liquid separation of the second precursor composition to obtain the second precursor particles including the hydrocarbon solvent in the hollow portion.

(5) Solvent Removal Step

The solvent removal step includes removing the hydrocarbon solvent from the second precursor particles obtained by the solid-liquid separation step to obtain the hollow particles.

FIG. 1 is a schematic diagram showing an example of the production method described above. The diagrams (1) to (5) in FIG. 1 correspond to the steps (1) to (5) described above, respectively. White arrows between the diagrams indicate the order of the steps. FIG. 1 is merely a schematic diagram for description, and the above-described production method is not limited to the method shown in FIG. 1. Further, the structures, dimensions and shapes of materials used for the production method of the present disclosure are not limited to the structures, dimensions and shapes of various materials shown in these diagrams.

The diagram (1) of FIG. 1 is a schematic cross-sectional view showing an embodiment of the mixture liquid in the mixture liquid preparation step. As shown in the diagram, the mixture liquid contains an aqueous medium 1 and a low polarity material 2 dispersed in the aqueous medium 1. Here, the low polarity material 2 means a material that has low polarity and is less likely to mix with the aqueous medium 1. In the present disclosure, the low polarity material 2 contains the first polymerizable monomer and the hydrocarbon solvent.

The diagram (2) of FIG. 1 is a schematic cross-sectional view showing an embodiment of the suspension in the suspension step. The suspension contains the aqueous medium 1 and a droplet 10 of the monomer composition dispersed in the aqueous medium 1. The droplet 10 of the monomer composition contains the first polymerizable monomer and the hydrocarbon solvent, and their distribution in the droplet is not uniform. The droplet 10 of the monomer composition has the following structure: phase separation occurs between the hydrocarbon solvent (hydrocarbon solvent 4a) and a material 4b containing the first polymerizable monomer and not containing the hydrocarbon solvent; the hydrocarbon solvent 4a is distributed in the center; the material 4b not containing the hydrocarbon solvent is distributed on the surface side; and the dispersion stabilizer (not shown) is on the surface.

The diagram (3) of FIG. 1 is a schematic cross-sectional view showing an embodiment of the composition (the second precursor composition) which is obtained by the polymerization step and which contains the hollow particle (the second precursor particle) including the hydrocarbon solvent in the hollow portion. The composition contains the aqueous medium 1 and a hollow particle 20 (the second precursor particle) which is dispersed in the aqueous medium 1 and which includes the hydrocarbon solvent 4a in the hollow portion. A shell 6 forming the outer surface of the second precursor particle 20 is formed by polymerization of the first polymerizable monomer in the droplet 10 of the monomer composition and polymerization of the second polymerizable monomer added later.

The diagram (4) of FIG. 1 is a schematic cross-sectional view showing an embodiment of the hollow particle including the hydrocarbon solvent in the hollow portion (the second precursor particle) after the solid-liquid separation step. The diagram (4) of FIG. 1 shows a state where the aqueous medium 1 has been removed from the state shown in the diagram (3) of FIG. 1.

The diagram (5) of FIG. 1 is a schematic cross-sectional view showing an embodiment of the hollow particle after the solvent removal step. The diagram (5) of FIG. 1 shows a state where the hydrocarbon solvent 4a has been removed from the state shown in the diagram (4) of FIG. 1. By the removal of the hydrocarbon solvent from the hollow particle (the second precursor particle) including the hydrocarbon solvent in the hollow portion, a hollow particle 100 having a gas-filled hollow portion 8 in the interior of the shell 6, is obtained.

Hereinbelow, the five steps described above and other steps are described in order.

(1) Mixture Liquid Preparation Step

The mixture liquid preparation step includes preparing the mixture liquid containing the first polymerizable monomer, the hydrocarbon solvent, the dispersion stabilizer and the aqueous medium.

The mixture liquid may further contain a polar component. Also, the mixture liquid preferably contains an oil-soluble polymerization initiator as a polymerization initiator. Also, the mixture liquid may further contain other materials such as a suspension stabilizer, to the extent that does not impair the effects of the present disclosure.

The materials for the mixture liquid will be described in the order of (A) the first polymerizable monomer, (B) the polar component, (C) the oil-soluble polymerization initiator, (D) the hydrocarbon solvent, (E) the dispersion stabilizer and (F) the aqueous medium.

(A) First Polymerizable Monomer

The first polymerizable monomer contains at least the crosslinkable monomer. It may further contain the non-crosslinkable monomer to the extent that does not impair the effects of the present disclosure.

From the point of view that the polymerization reaction is easily stabilized and hollow particles with high heat resistance are obtained, a (meth)acrylic polymerizable monomer containing a (meth)acryloyl group as a polymerizable functional group, is preferably used as the first polymerizable monomer.

Meanwhile, from the viewpoint of decreasing the relative permittivity and dielectric dissipation factor of the hollow particles, a hydrocarbon monomer composed of carbon and hydrogen can be preferably used.

[Crosslinkable Monomer]

Since the crosslinkable monomer has a plurality of polymerizable functional groups, monomers can be linked together, and the crosslinking density of the shell can be increased.

As the crosslinkable monomer, examples include, but are not limited to, a bifunctional crosslinkable monomer having two polymerizable functional groups, such as divinylbenzene, divinylbiphenyl, divinylnaphthalene, diallyl phthalate, diallylamine, allyl(meth)acrylate, vinyl(meth)acrylate, ethylene glycol di(meth)acrylate, diethylene glycol di(meth)acrylate, pentaerythritol di(meth)acrylate, and 2-hydroxy-3-(meth)acryloyloxypropyl (meth)acrylate, and trifunctional or higher-functional crosslinkable monomers having three or more polymerizable functional groups, such as trimethylolpropane tri(meth)acrylate, ditrimethylolpropane tetra(meth)acrylate, pentaerythritol tri(meth)acrylate, pentaerythritol tetra(meth)acrylate, dipentaerythritol hexa(meth)acrylate, dipentaerythritol poly(meth)acrylate, and ethoxylates thereof. These crosslinkable monomers may be used alone or in combination of two or more.

Of these crosslinkable monomers, examples of the hydrophilic crosslinkable monomer having a solubility of 0.3 g/L or more in distilled water at 20° C., include ethylene glycol dimethacrylate, diethylene glycol diacrylate, aryl methacrylate, vinyl methacrylate, 2-hydroxy-3-methacryloyloxypropyl acrylate and diallylamine.

The crosslinkable monomer contained in the first polymerizable monomer is not particularly limited. It may be a hydrophilic crosslinkable monomer having a solubility of 0.3 g/L or more in distilled water at 20° C., or it may be a non-hydrophilic crosslinkable monomer having a solubility of less than 0.3 g/L in distilled water at 20° C.

As the crosslinkable monomer, the first polymerizable monomer contains at least one selected from the bifunctional crosslinkable monomer and the trifunctional or higher-functional crosslinkable monomer. From the viewpoint of decreasing the CTE of the hollow particles, the first polymerizable monomer preferably contains at least the bifunctional crosslinkable monomer, and from the viewpoint of increasing the strength of the hollow particles, the first polymerizable monomer more preferably contains a combination of the bifunctional crosslinkable monomer and the trifunctional or higher-functional crosslinkable monomer. A case in which the first polymerizable monomer contains the trifunctional or higher-functional crosslinkable monomer, is superior in that the covalent bond network can be more tightly strung in the shell; however, unreacted polymerizable functional groups tend to remain after the first polymerization reaction. In the above-described production method, even when the first polymerizable monomer contains the trifunctional or higher-functional crosslinkable monomer, the polymerization reaction of the unreacted polymerizable functional groups remaining after the first polymerization reaction, is likely to progress by the second polymerization reaction performed by adding the hydrophilic monomer as the second polymerizable monomer. Accordingly, when the first polymerizable monomer contains the trifunctional or higher-functional crosslinkable monomer, the crosslinked structure of the shell is more densified; the CTE, relative permittivity and dielectric dissipation factor of the hollow particles are decreased; and the strength of the hollow particles is increased.

Also, the crosslinkable monomer contained in the first polymerizable monomer is preferably a (meth)acrylic crosslinkable monomer containing, as a polymerizable functional group, a (meth)acryloyl group, from the following points of view: the polymerization reaction is easily stabilized; hollow particles with high strength and high heat resistance are obtained; and the adhesion of the resin composition containing the obtained hollow particles is increased.

More specifically, the bifunctional crosslinkable monomer used as the first polymerizable monomer is preferably a bifunctional (meth)acrylic crosslinkable monomer such as allyl(meth)acrylate, ethylene glycol di(meth)acrylate, diethylene glycol di(meth)acrylate and pentaerythritol di(meth)acrylate. Of them, ethylene glycol di(meth)acrylate and pentaerythritol di(meth)acrylate are more preferred.

The trifunctional or higher-functional crosslinkable monomer used as the first polymerizable monomer is preferably a trifunctional or higher-functional (meth)acrylic crosslinkable monomer such as trimethylolpropane tri(meth)acrylate, ditrimethylolpropane tetra(meth)acrylate, pentaerythritol tri(meth)acrylate, pentaerythritol tetra(meth)acrylate, dipentaerythritol hexa(meth)acrylate, dipentaerythritol poly(meth)acrylate and ethoxylates thereof. Of them, pentaerythritol tetra(meth)acrylate, trimethylolpropane tri(meth)acrylate, ethoxylated trimethylolpropane tri(meth)acrylate, ethoxylated pentaerythritol tetra(meth)acrylate, pentaerythritol tri(meth)acrylate and dipentaerythritol poly(meth)acrylate are more preferred, and trimethylolpropane tri(meth)acrylate and pentaerythritol tetra(meth)acrylate are still more preferred.

In the present disclosure, the (meth)acrylic crosslinkable monomer is only required to be a crosslinkable monomer having at least one (meth)acryloyl group as a polymerizable functional group, and the (meth)acrylic crosslinkable monomer is preferably such that all polymerizable functional groups thereof are (meth)acryloyl groups.

When the first polymerizable monomer contains the (meth)acrylic crosslinkable monomer, the content of the (meth)acrylic crosslinkable monomer in 100 parts by mass of the crosslinkable monomer contained in the first polymerizable monomer, is preferably 50 parts by mass or more, more preferably 70 parts by mass or more, and still more preferably 90 parts by mass or more. The crosslinkable monomer contained in the first polymerizable monomer may be composed of the (meth)acrylic crosslinkable monomer.

From the point of view that the relative permittivity and dielectric dissipation factor of the hollow particles are easily decreased, a hydrocarbon-based crosslinkable monomer such as divinylbenzene, divinylbiphenyl and divinylnaphthalene is also preferred as the crosslinkable monomer contained in the first polymerizable monomer. Of them, divinylbenzene is more preferred.

In 100 parts by mass of the first polymerizable monomer, the content of the crosslinkable monomer is preferably from 75 parts by mass to 100 parts by mass, more preferably from 80 parts by mass to 100 parts by mass, still more preferably from 85 parts by mass to 100 parts by mass, and even more preferably from 90 parts by mass to 100 parts by mass. When the content of the crosslinkable monomer is equal to or more than the lower limit value, the polymer contained in the formed shell easily becomes the polymer in which from 70 parts by mass to 100 parts by mass of the crosslinkable monomer unit is contained in 100 parts by mass of all monomer units. Moreover, since the content of the crosslinkable monomer unit in the shell of the hollow particles is large enough, the covalent bond network is tightly strung in the shell. As a result, the CTE, relative permittivity and dielectric dissipation factor of the hollow particles are decreased, and the strength of the hollow particles is increased.

When the first polymerizable monomer contains the bifunctional crosslinkable monomer as the crosslinkable monomer, the content of the bifunctional crosslinkable monomer in 100 parts by mass of the first polymerizable monomer is not particularly limited. The lower limit is preferably 70 parts by mass or more, and more preferably 75 parts by mass or more, from the viewpoint of decreasing the CTE, relative permittivity and dielectric dissipation factor of the hollow particles and increasing the strength of the hollow particles. On the other hand, the upper limit may be 100 parts by mass or less. From the viewpoint of sufficiently containing the trifunctional or higher-functional crosslinkable monomer unit, the upper limit is preferably 95 parts by mass or less, and more preferably 90 parts by mass or less.

When the first polymerizable monomer contains the trifunctional or higher-functional crosslinkable monomer as the crosslinkable monomer, the content of the trifunctional or higher-functional crosslinkable monomer in 100 parts by mass of the first polymerizable monomer is not particularly limited. From the viewpoint of decreasing the CTE, relative permittivity and dielectric dissipation factor of the hollow particles and increasing the strength of the hollow particles, the lower limit is preferably 5 parts by mass or more, more preferably 10 parts by mass or more, and still more preferably 15 parts by mass or more. The upper limit is preferably 50 parts by mass or less, and more preferably 40 parts by mass or less. From the viewpoint of sufficiently containing the bifunctional or higher-functional crosslinkable monomer, the upper limit is still more preferably 30 parts by mass or less, and even more preferably 25 parts by mass or less.

[Non-Crosslinkable Monomer]

The first polymerizable monomer may further contain a non-crosslinkable monomer.

As the non-crosslinkable monomer, a monovinyl monomer is preferably used. The monovinyl monomer is a compound having one polymerizable vinyl functional group. As the monovinyl monomer, examples include, but are not limited to, the following non-hydrophilic non-crosslinkable monomers and hydrophilic non-crosslinkable monomers: non-hydrophilic non-crosslinkable monomers including a (meth)acrylic acid alkyl ester containing an alkyl group having 6 or more carbon atoms, such as 2-ethylhexyl (meth)acrylate and lauryl (meth)acrylate; an aromatic vinyl monomer such as styrene, vinyltoluene, α-methylstyrene, p-methylstyrene and halogenated styrene; a monoolefin monomer such as ethylene, propylene and butylene; a diene monomer such as butadiene and isoprene; a carboxylic acid vinyl ester monomer such as vinyl acetate; a vinyl halide monomer such as vinyl chloride; a vinylidene halide monomer such as vinylidene chloride; and vinylpyridine, and hydrophilic non-crosslinkable monomers including a (meth)acrylic acid alkyl ester containing an alkyl group having 1 to 5 carbon atoms, such as methyl (meth)acrylate, ethyl (meth)acrylate and butyl (meth)acrylate; a (meth)acrylamide such as (meth)acrylamide, N-methylol (meth)acrylamide and N-butoxymethyl (meth)acrylamide and derivatives thereof; (meth)acrylic acid nitrile and derivatives thereof; and polar group-containing non-crosslinkable monomers.

The polar group-containing non-crosslinkable monomer is preferably a non-crosslinkable monomer containing a polar group selected from a carboxyl group, a hydroxyl group, a sulfonic acid group, an amino group, a polyoxyethylene group and an epoxy group. As such a non-crosslinkable monomer, examples include, but are not limited to, a carboxyl group-containing monomer such as an ethylenically unsaturated carboxylic acid monomer such as (meth)acrylic acid, crotonic acid, cinnamic acid, itaconic acid, fumaric acid, maleic acid and butene tricarboxylic acid; a hydroxyl group-containing monomer such as 2-hydroxyethyl (meth)acrylate, 2-hydroxypropyl (meth)acrylate and 4-hydroxybutyl (meth)acrylate; a sulfonic acid group-containing monomer such as styrenesulfonic acid; an amino group-containing monomer such as dimethylaminoethyl (meth)acrylate and diethylaminoethyl (meth)acrylate; a polyoxyethylene group-containing monomer such as methoxypolyethylene glycol (meth)acrylate; and an epoxy group-containing monomer such as glycidyl (meth)acrylate, allyl glycidyl ether and 4-hydroxybutyl acrylate glycidyl ether.

These non-crosslinkable monomers may be used alone or in combination of two or more.

From the viewpoint of increasing the strength of the hollow particles, as the non-crosslinkable monomer used as the first polymerizable monomer, hydrophilic non-crosslinkable monomers are preferred; (meth)acrylic acid alkyl esters containing an alkyl group having 1 to 5 carbon atoms are more preferred; (meth)acrylic acid alkyl esters containing an alkyl group having 1 to 4 carbon atoms are still more preferred; and methyl (meth)acrylate is even more preferred.

In the first polymerizable monomer, the polymerizable monomer other than the crosslinkable monomer is the non-crosslinkable monomer. In 100 parts by mass of the first polymerizable monomer, the content of the non-crosslinkable monomer is preferably from 0 parts by mass to 25 parts by mass. The content of the non-crosslinkable monomer in the first polymerizable monomer is more preferably 20 parts by mass or less, still more preferably 15 parts by mass or less, and even more preferably 10 parts by mass or less, and the first polymerizable monomer is particularly preferably free of the non-crosslinkable monomer, from the following points of view: a decrease in the reactivity of the first polymerizable monomer is suppressed; the CTE, relative permittivity and dielectric dissipation factor of the hollow particles are decreased; and the strength of the hollow particles is increased.

The content of the first polymerizable monomer in the mixture liquid is not particularly limited. From the viewpoint of the balance of the void ratio, particle diameter and mechanical strength of the hollow particles, with respect to the total mass (100% by mass) of the components (except for the aqueous medium) in the mixture liquid, the content of the first polymerizable monomer is generally from 15% by mass to 55% by mass, and more preferably from 25% by mass to 40% by mass.

From the viewpoint of increasing the mechanical strength of the hollow particles, the content of the first polymerizable monomer is preferably 90% by mass or more, and more preferably 95% by mass or more, with respect to the total mass (100% by mass) of a solid component obtained by excluding the hydrocarbon solvent from the material for the oil phase in the mixture liquid.

(B) Polar Component

The mixture liquid may further contain the polar component. When the mixture liquid contains the polar component, the hollow particles which are less likely to collapse even when the void ratio is high, can be obtained.

As the polar component, an organic acid, a metal salt thereof, or the below-described polar resin may be used.

As the organic acid, examples include a rosin acid and a higher fatty acid. As the higher fatty acid, examples include higher fatty acids containing 10 to 25 carbon atoms from which the carbon atom of the carboxyl group is excluded.

As the metal used in the metal salt of the organic acid, examples include, but are not limited to, an alkali metal such as Li, Na and K, and an alkaline-earth metal such as Mg and Ca. Of them, an alkali metal is preferred, and at least one selected from Li, Na and K is more preferred.

When the organic acid or metal salt thereof is used as the polar component, the total content of the organic acid and metal salt thereof is preferably 0.0001 parts by mass or more and 0.1 parts by mass or less, more preferably 0.001 parts by mass or more and 0.01 parts by mass or less, and still more preferably 0.0015 parts by mass or more and 0.006 parts by mass or less, with respect to the total (100 parts by mass) of the first polymerizable monomer and the hydrocarbon solvent. When the total content is equal to or more than the lower limit value, the thickness of the shell of the hollow particles can be easily controlled, and the strength of the hollow particles can be increased. On the other hand, when the total content is equal to or less than the upper limit value, a decrease in the content of the polymerizable monomer can be suppressed. Accordingly, a decrease in the strength of the shell can be suppressed, and a collapse of the hollow particles can be further suppressed.

The polar resin is a polymer containing a repeating unit which contains a heteroatom. As the polar resin, examples include, but are not limited to, an acrylic resin, a polyester resin, and a vinyl resin containing a heteroatom.

The polar resin may be a homopolymer or copolymer of a heteroatom-containing monomer, or it may be a copolymer of a heteroatom-containing monomer and a heteroatom-free monomer. When the polar resin is a copolymer of a heteroatom-containing monomer and a heteroatom-free monomer, from the viewpoint of easily controlling the particle diameter of the hollow particles, in 100% by mass of all repeating units constituting the copolymer, the amount of the heteroatom-containing monomer unit is preferably 50% by mass or more, more preferably 70% by mass or more, and still more preferably 90% by mass or more.

The number average molecular weight (Mn) of the polar resin is not particularly limited. The polystyrene equivalent number average molecular weight (Mn) of the polar resin, which is measured by gel permeation chromatography (GPC) using tetrahydrofuran, is preferably in a range of 3000 or more and 20000 or less, more preferably in a range of 4000 or more and 17000 or less, and still more preferably in a range of 6000 or more and 15000 or less. When the number average molecular weight (Mn) of the polar resin is equal to or more than the lower limit value, the solubility of the polar resin is increased, and the particle diameter of the hollow particles can be easily controlled. When the number average molecular weight of the polar resin is equal to or less than the upper limit value, a decrease in the strength of the shell can be suppressed.

When the polar resin is used as the polar component, the content of the polar resin is preferably 0.1 parts by mass or more and 10.0 parts by mass or less, more preferably 0.3 parts by mass or more and 8.0 parts by mass or less, and still more preferably 0.5 parts by mass or more and 8.0 parts by mass or less, with respect to 100 parts by mass of the first polymerizable monomer. When the content of the polar resin is equal to or more than the lower limit value, the thickness of the shell of the hollow particles can be easily controlled, and the strength of the hollow particles can be increased. On the other hand, when the content of the polar resin is equal to or less than the upper limit value, a decrease in the content of the polymerizable monomer can be suppressed. Accordingly, a decrease in the strength of the shell can be suppressed, and a collapse of the hollow particles can be further suppressed.

(C) Oil-Soluble Polymerization Initiator

In the present disclosure, the mixture liquid preferably contains an oil-soluble polymerization initiator as the polymerization initiator. As the method for polymerizing the droplets of the monomer composition after suspending the mixture liquid, examples include an emulsion polymerization method using a water-soluble polymerization initiator and a suspension polymerization method using an oil-soluble polymerization initiator. By using the oil-soluble polymerization initiator, suspension polymerization can be performed.

The oil-soluble polymerization initiator is not particularly limited, as long as it is a lipophilic one having a solubility in water of 0.2% by mass or less. As the oil-soluble polymerization initiator, examples include, but are not limited to, benzoyl peroxide, lauroyl peroxide, t-butyl peroxy-2-ethylhexanoate, 2,2'-azobis(2,4-dimethylvaleronitrile) and azobis(isobutyronitrile).

When the total mass of the first polymerizable monomer in the mixture liquid is regarded as 100 parts by mass, the content of the oil-soluble polymerization initiator is preferably from 0.1 parts by mass to 10 parts by mass, more preferably from 0.5 parts by mass to 7 parts by mass, and still more preferably from 1 part by mass to 5 parts by mass. When the content of the oil-soluble polymerization initiator is from 0.1 parts by mass to 10 parts by mass, a polymerization reaction can progress sufficiently; the oil-soluble polymerization initiator is less likely to remain after the end of the polymerization reaction; and an unexpected side reaction is less likely to progress.

(D) Hydrocarbon Solvent

In the present disclosure, the hydrocarbon solvent is used as a non-polymerizable, sparingly water-soluble organic solvent. The hydrocarbon solvent serves as a spacer material for forming the hollow portion in the interior of the particles. In the suspension step described later, the suspension in which the droplets of the monomer composition containing the hydrocarbon solvent are dispersed in the aqueous medium, is obtained. In the suspension step, phase separation occurs in the droplets of the monomer composition. As a result, the hydrocarbon solvent with low polarity is likely to collect in the interior of the droplets of the monomer composition. In the end, according to their respective polarities, the hydrocarbon solvent is distributed in the interior of the droplets of the monomer composition, and the material not containing the hydrocarbon solvent is distributed at the periphery of the droplets of the monomer composition.

Then, in the polymerization step described later, an aqueous dispersion containing the hollow particles including the hydrocarbon solvent, is obtained. That is, since the hydrocarbon solvent collects in the interior of the particles, the hollow portion filled with the hydrocarbon solvent is formed in the interior of the obtained precursor particles.

The type of the hydrocarbon solvent is not particularly limited. Examples of the hydrocarbon solvent include a saturated hydrocarbon solvent such as butane, pentane, n-hexane, cyclohexane, heptane and octane, an aromatic hydrocarbon solvent such as benzene, toluene and xylene, and a solvent with relatively high volatility such as carbon disulfide and carbon tetrachloride.

The void ratio of the hollow particles can be controlled by changing the amount of the hydrocarbon solvent in the mixture liquid. In the suspension step described later, the polymerization reaction progresses while oil droplets containing the crosslinkable monomer and so on include the hydrocarbon solvent. Accordingly, as the content of the hydrocarbon solvent increases, the void ratio of the obtained hollow particles tends to increase.

For the hydrocarbon solvent, the amount of the saturated hydrocarbon solvent is preferably 50% by mass or more, with respect to the total amount (100% by mass) of the hydrocarbon solvent. Accordingly, sufficient phase separation occurs in the droplets of the monomer composition. As a result, hollow particles having only one hollow portion can be easily obtained, and the production of porous particles can be suppressed. The amount of the saturated hydrocarbon solvent is preferably 60% by mass or more, and more preferably 80% by mass or more, from the point of view that the production of porous particles is further suppressed, and that the hollow portions of the hollow particles are likely to be uniform.

The hydrocarbon solvent is preferably a hydrocarbon solvent having 4 to 7 carbon atoms. A hydrocarbon compound having 4 to 7 carbon atoms can be easily included in the first precursor particles in the polymerization step and can be easily removed from the second precursor particles in the solvent removal step. A hydrocarbon solvent having 5 or 6 carbon atoms is particularly preferred.

From the viewpoint of ease of removal in the solvent removal step described later, the hydrocarbon solvent is preferably a hydrocarbon solvent having a boiling point of 130° C. or less, and more preferably a hydrocarbon solvent having a boiling point of 100° C. or less. The hydrocarbon solvent is preferably a hydrocarbon solvent having a boiling point of 50° C. or more, and more preferably a hydrocarbon solvent having a boiling point of 60° C. or more, from the point of view that the hydrocarbon solvent can be easily included in the first precursor particles.

The relative permittivity at 20° C. of the hydrocarbon solvent is preferably 3 or less. The relative permittivity is one of the indices of the level of the polarity of a compound. In the case where the relative permittivity of the hydrocarbon solvent is 3 or less and sufficiently small, it is considered that phase separation progresses rapidly in the droplets of the monomer composition and a hollow is easily formed.

Examples of solvents having a relative permittivity at 20° C. of 3 or less, are as follows. The inside of the parentheses is the value of relative permittivity.

Heptane (1.9), n-hexane (1.9), cyclohexane (2.0), benzene (2.3), and toluene (2.4).

For the relative permittivity at 20° C., values written in known literatures (for example, the Chemical Society of Japan, as editor, "Kagaku Binran, Kiso Hen, Kaitei 4 Ban", pp. II-498 to II-503, published by Maruzen Publishing Co., Ltd. on Sep. 30, 1993) and other technical information may be used as reference. Examples of the method of measuring the relative permittivity at 20° C. include a relative permittivity test that is in conformity with 23 of JIS C 2101:1999 and is performed with the measuring temperature set to 20° C.

In the present disclosure, with respect to the total mass (100 parts by mass) of the first polymerizable monomer, the content of the hydrocarbon solvent in the mixture liquid is preferably 50 parts by mass or more and 500 parts by mass or less, from the following viewpoints: the particle diameter of the hollow particles is easily controlled; the void ratio is easily increased while maintaining the strength of the hollow particles; and the amount of the residual hydrocarbon solvent in the particles is easily reduced. With respect to the total mass (100 parts by mass) of the first polymerizable monomer, the content of the hydrocarbon solvent in the mixture liquid is more preferably 60 parts by mass or more and 400 parts by mass or less, still more preferably 70 parts by mass or more and 300 parts by mass or less, and even more preferably 80 parts by mass or more and 200 parts by mass or less.

(E) Dispersion Stabilizer

The dispersion stabilizer is an agent for dispersing the droplets of the monomer composition in the aqueous medium in the suspension step. In the present disclosure, an inorganic dispersion stabilizer is preferably used as the dispersion stabilizer, from the point of view that the particle diameter of the droplets can be easily controlled in the suspension and the particle size distribution of the obtained hollow particles can be sharp, and that an excessive decrease in the shell thickness is suppressed, and a decrease in the strength of the hollow particles is suppressed.

As the inorganic dispersion stabilizer, examples include, but are not limited to, inorganic compounds including a sulfate such as barium sulfate and calcium sulfate; a carbonate such as barium carbonate, calcium carbonate and magnesium carbonate; a phosphate such as calcium phosphate; a metal oxide such as aluminum oxide and titanium oxide; and a metal hydroxide such as aluminum hydroxide, magnesium hydroxide, calcium hydroxide, barium hydroxide and iron(II)hydroxide. These inorganic dispersion stabilizers may be used alone or in combination of two or more.

Of these inorganic dispersion stabilizers, a sparingly water-soluble inorganic metal salt such as the above-mentioned sulfate, carbonate, phosphate and metal hydroxide is preferred; a metal hydroxide is more preferred; and a magnesium hydroxide is particularly preferred.

In the present disclosure, the sparingly water-soluble inorganic metal salt is preferably an inorganic metal salt such that the solubility in 100 g of water is 0.5 g or less.

In the present disclosure, the sparingly water-soluble inorganic dispersion stabilizer is particularly preferably used in the form of colloidal particles being dispersed in the aqueous medium, that is, in the form of a colloidal dispersion containing the sparingly water-soluble, inorganic dispersion stabilizer colloidal particles. Accordingly, the particle size distribution of the droplets of the monomer composition can be sharp; moreover, the amount of the residual inorganic dispersion stabilizer in the obtained hollow particles can be easily reduced by washing.

The colloidal dispersion containing the sparingly water-soluble inorganic dispersion stabilizer colloidal particles can be prepared by, for example, reacting at least one selected from alkali metal hydroxide salts and alkaline earth metal hydroxide salts with a water-soluble polyvalent metal salt, which is not an alkaline earth metal hydroxide salt, in the aqueous medium.

As the alkali metal hydroxide salts, examples include, but are not limited to, lithium hydroxide, sodium hydroxide and potassium hydroxide. As the alkaline earth metal hydroxide salts, examples include, but are not limited to, barium hydroxide and calcium hydroxide.

The water-soluble polyvalent metal salt may be a water-soluble polyvalent metal salt other than compounds corresponding to the above-mentioned alkaline earth metal hydroxide salts. As the polyvalent metal salt, examples include, but are not limited to, magnesium metal salts such as magnesium chloride, magnesium phosphate and magnesium sulfate; calcium metal salts such as calcium chloride, calcium nitrate, calcium acetate and calcium sulfate; aluminum metal salts such as aluminum chloride and aluminum sulfate; barium salts such as barium chloride, barium nitrate and barium acetate; and zinc salts such as zinc chloride, zinc nitrate and zinc acetate. Among them, magnesium metal salts, calcium metal salts and aluminum metal salts are preferred; magnesium metal salts are more preferred; and magnesium chloride is particularly preferred. The water-soluble polyvalent metal salts may be used alone or in combination of two or more.

The method for reacting the water-soluble polyvalent metal salt with the at least one selected from alkali metal hydroxide salts and alkaline earth metal hydroxide salts in the aqueous medium, is not particularly limited. As the method, examples include, but are not limited to, mixing an aqueous solution of the water-soluble polyvalent metal salt and an aqueous solution of the at least one selected from alkali metal hydroxide salts and alkaline earth metal hydroxide salts.

The content of the dispersion stabilizer is not particularly limited. With respect to the total mass (100 parts by mass) of the first polymerizable monomer and the hydrocarbon solvent, the content of the dispersion stabilizer is preferably from 0.5 parts by mass to 10 parts by mass, and more preferably from 1.0 part by mass to 8.0 parts by mass. When the content of the dispersion stabilizer is equal to or more than the lower limit value, the droplets of the monomer composition can be sufficiently dispersed in the suspension so that they do not join together. On the other hand, when the content of the dispersion stabilizer is equal to or less than the upper limit value, an increase in the viscosity of the suspension is prevented in the formation of the droplets, and a problem such that a droplet forming machine is clogged with the suspension, can be avoided.

With respect to 100 parts by mass of the aqueous medium, the content of the dispersion stabilizer is generally 2 parts by mass or more and 15 parts by mass or less, and preferably 3 parts by mass or more and 8 parts by mass or less.

(F) Aqueous Medium

In the present disclosure, the term "aqueous medium" means a medium selected from the group consisting of water, a hydrophilic solvent and a mixture thereof.

The hydrophilic solvent in the present disclosure is not particularly limited, as long as it is one that mixes with water sufficiently and does not develop phase separation. Examples of the hydrophilic solvent include alcohols such as methanol and ethanol; tetrahydrofuran (THF); and dimethyl sulfoxide (DMSO).

Among the aqueous media, water is preferably used in terms of its high polarity. When a mixture of water and a hydrophilic solvent is used, from the viewpoint of forming the droplets of the monomer composition, it is important that the polarity of the entire mixture is not too low. In this case, for example, the mixing ratio (mass ratio) between water and the hydrophilic solvent may be set to water:hydrophilic solvent=99:1 to 50:50.

The mixture liquid is obtained by mixing the above-mentioned materials and other materials as needed, appropriately stirring the mixture, etc. In the mixture liquid, an oil phase containing the lipophilic materials such as (A) the first polymerizable monomer, (B) the polar component, (C) the oil-soluble polymerization initiator and (D) the hydrocarbon solvent, is dispersed with a size of a particle diameter of approximately several millimeters in an aqueous phase containing (E) the dispersion stabilizer, (F) the aqueous medium, etc. The dispersion state of these materials in the mixture liquid can be observed with the naked eye, depending on the types of the materials.

In the mixture liquid preparation step, the mixture liquid may be obtained by simply mixing the above-mentioned materials and other materials as needed, appropriately stirring the mixture, etc. From the point of view that the shell can be easily uniform, it is preferable to prepare the mixture liquid by separately preparing the oil phase containing the first polymerizable monomer, the polar component and the hydrocarbon solvent with the aqueous phase containing the dispersion stabilizer and the aqueous medium in advance, and then mixing the phases together. In the present disclosure, a colloidal dispersion in which a sparingly water-soluble inorganic dispersion stabilizer is dispersed in the form of colloidal particles in the aqueous medium, can be preferably used as the aqueous phase.

As just described, by separately preparing the oil phase and the aqueous phase in advance and then mixing them, hollow particles such that the composition of the shell portion is uniform, can be produced.

(2) Suspension Step

The suspension step includes suspending the mixture liquid to prepare the suspension in which the droplets of the monomer composition containing the hydrocarbon solvent are dispersed in the aqueous medium.

The suspension method for forming the droplets of the monomer composition is not particularly limited. For example, it is performed using an apparatus capable of performing strong stirring, such as an (in-line type) emulsifying disperser (e.g., a horizontal in-line type disperser such as MILDER (product name, manufactured by Pacific Machinery & Engineering Co., Ltd.) and CAVITRON (product name, manufactured by EUROTEC, Ltd.) and a vertical in-line type disperser such as DRS 2000/5 (product name, manufactured by IKA Works, Inc.)) and a high-speed emulsifying disperser such as T. K. HOMOMIXER MARK II (product name, manufactured by PRIMIX Corporation).

In the suspension prepared in the suspension step, the droplets of the monomer composition containing the lipophilic materials mentioned above and having a particle diameter of from 1 μm to 60 μm, are dispersed uniformly in the aqueous medium. Such droplets of the monomer composition are difficult to observe with the naked eye and can be observed with a known observation instrument such as an optical microscope.

In the suspension step, since phase separation occurs in the droplets of the monomer composition, the hydrocarbon solvent with low polarity is likely to collect in the interior of the droplets. As a result, in the obtained droplets, the hydrocarbon solvent is distributed in the interior thereof, and the material not containing the hydrocarbon solvent is distributed at the periphery thereof.

Figure 2:
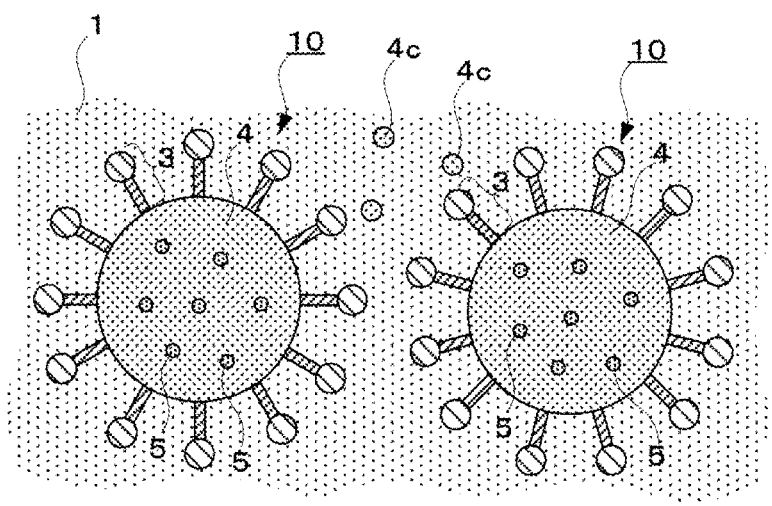
FIG. 2 is a schematic diagram showing an embodiment of a suspension in a suspension step.

FIG. 2 is a schematic diagram showing an embodiment of the suspension in the suspension step. Each droplet 10 of the monomer composition in FIG. 2 schematically shows a cross section thereof. FIG. 2 is merely a schematic diagram, and the suspension in the present disclosure is not limited to that shown in FIG. 2. A part of FIG. 2 corresponds to the diagram (2) of FIG. 1 described above.

FIG. 2 shows a state where the droplets 10 of the monomer composition and the first polymerizable monomer 4c dispersed in the aqueous medium 1, are dispersed in the aqueous medium 1. Each droplet 10 is formed by the oil-soluble monomer composition 4 and a dispersion stabilizer 3 surrounding the periphery of the oil-soluble monomer composition 4.

The monomer composition contains the oil-soluble polymerization initiator 5, the first polymerizable monomer and the hydrocarbon solvent (none of them is illustrated).

Each droplet 10 is a minute oil droplet which contains the monomer composition 4, and the oil-soluble polymerization initiator 5 generates polymerization initiating radicals in the interior of the minute oil droplet. Therefore, the precursor particles with a target particle diameter can be produced without excessively growing the minute oil droplet.

In such a suspension polymerization method using the oil-soluble polymerization initiator, there is no opportunity for the polymerization initiator to come into contact with the polymerizable monomer 4c dispersed in the aqueous medium 1. Thus, the generation of surplus resin particles (e.g., solid particles having a relatively small particle diameter) in addition to the target resin particles having the hollow portion, can be suppressed by using the oil-soluble polymerization initiator.

(3) Polymerization Step
(3-1) First Polymerization Step

In the production method, the polymerization step is carried out in two stages.

In the first polymerization step, the first polymerization reaction is performed by subjecting the suspension to a polymerization reaction, until the polymerization conversion rate of the first polymerizable monomer reaches 93% by mass or more. Accordingly, the first precursor composition containing the first precursor particles that have the shell containing the polymer of the first polymerizable monomer and the hollow portion filled with the hydrocarbon solvent, is prepared.

In the first polymerization reaction, the droplets of the monomer composition are subjected to a polymerization reaction while the hydrocarbon solvent is included in them. Accordingly, the polymerization reaction is likely to progress while the shape of the droplets is retained. As a result, the size and void ratio of the obtained hollow particles can be easily controlled by controlling the amount of the hydrocarbon solvent, the amount of the polar component, the type of the dispersion stabilizer, and so on in the first polymerization reaction. Moreover, since the above-described first polymerizable monomer and the hydrocarbon solvent are used together, the polarity of the hydrocarbon solvent is low with respect to the shell of the first precursor particles, and the hydrocarbon solvent is not easily compatible with the shell. Accordingly, sufficient phase separation occurs and only one hollow portion is likely to be formed.

In the first polymerization reaction, the polymerization system is not particularly limited. For example, a batch system, a semicontinuous system or a continuous system may be employed.

In the first polymerization reaction, the polymerization temperature is preferably from 40° C. to 80° C., and more preferably from 50° C. to 70° C.

Also in the first polymerization reaction, the temperature increase rate up to the polymerization temperature, is preferably from 10° C./h to 60° C./h, and more preferably from 15° C./h to 55° C./h.

The polymerization reaction time of the first polymerization reaction is preferably from 0.5 hours to 5 hours, and more preferably from 1 hour to 3 hours.

In the production method, the first polymerization reaction is continued until the polymerization conversion rate of the first polymerizable monomer reaches 93% by mass or more, preferably 95% by mass or more, more preferably 97% by mass or more, and still more preferably 99% by mass or more.

In the present disclosure, the polymerization conversion rate is obtained by the following formula (A) using the mass of the solid component of the first precursor particles obtained by the first polymerization reaction and the mass of the first polymerizable monomer remaining unreacted after the first polymerization reaction. In the present disclosure, the solid component includes all components excluding a solvent, and a liquid polymerizable monomer and the like are included in the solid component. The mass of the unreacted first polymerizable monomer can be measured by gas chromatography (GC).

Polymerization conversion rate (% by mass)=100−(Mass of the unreacted first polymerizable monomer/Mass of the solid component of the first precursor particles)×100    Formula (A)

(3-2) Second Polymerization Step

In the second polymerization step, the second polymerization reaction is performed by adding the second polymerizable monomer having a solubility of 0.3 g/L or more in distilled water at 20° C. to the first precursor composition obtained by the first polymerization step and subjecting the composition to the polymerization reaction. Accordingly, the second precursor composition containing the second precursor particles that have the shell containing the polymer of the first and second polymerizable monomers and the hollow portion filled with the hydrocarbon solvent, is prepared.

In the second polymerization reaction, the polymerization reaction progresses in the state where the second polymerizable monomer is incorporated in the shell of the first precursor particles. The thermal motion of the shell of the first precursor particles is accelerated by incorporating the second polymerizable monomer in the shell. Accordingly, in the second polymerization reaction, the polymerization reaction of the second polymerizable monomer and the polymerizable functional groups of the first polymerizable monomer remaining unreacted in the shell, is presumed to sufficiently progress and result in the formation of the dense crosslinked structure.

The second polymerizable monomer is not particularly limited, as long as it is a polymerizable monomer having a solubility of 0.3 g/L or more in distilled water at 20° C. From the viewpoint of decreasing the CTE, relative permittivity and dielectric dissipation factor of the hollow particles and increasing the strength of the hollow particles, the second polymerizable monomer is preferably a non-crosslinkable monomer having a solubility of 0.3 g/L or more in distilled water at 20° C., that is, a hydrophilic non-crosslinkable monomer. As the hydrophilic non-crosslinkable monomer used as the second polymerizable monomer, examples include, but are not limited to, the same hydrophilic non-crosslinkable monomers as those that can be used as the first polymerizable monomer. From the viewpoint of decreasing the CTE, relative permittivity and dielectric dissipation factor of the hollow particles and increasing the strength of the hollow particles, preferred is at least one selected from the group consisting of an(meth)acrylic acid alkyl ester containing an alkyl group having 1 to 5 carbon atoms, (meth)acrylic acid nitrile and derivatives thereof, and a polar group-containing non-crosslinkable monomer.

The alkyl group of the (meth)acrylic acid alkyl ester preferably has 1 to 4 carbon atoms, and more preferably 1 to 3 carbon atoms. The (meth)acrylic acid alkyl ester is particularly preferably methyl (meth)acrylate.

As the polar group-containing non-crosslinkable monomer, an epoxy group-containing monomer, a hydroxyl group-containing monomer, and an amino group-containing monomer are preferred. The epoxy group-containing monomer used as the polar group-containing non-crosslinkable monomer is preferably glycidyl (meth)acrylate. The hydroxyl group-containing monomer used as the polar group-containing non-crosslinkable monomer is preferably 2-hydroxyethyl methacrylate.

As the second polymerizable monomer, a hydrophilic crosslinkable monomer having a solubility of 0.3 g/L or more in distilled water at 20° C., may be used. As the hydrophilic crosslinkable monomer used as the second polymerizable monomer, examples include, but are not limited to, the same hydrophilic crosslinkable monomers as those that can be used as the first polymerizable monomer. The hydrophilic crosslinkable monomer used as the second polymerizable monomer is preferably a hydrophilic crosslinkable monomer containing a hydroxyl group or an amino group. As the hydroxyl group-containing hydrophilic crosslinkable monomer, for example, 2-hydroxy-3-methacryloyloxypropyl acrylate is preferably used. As the amino group-containing hydrophilic crosslinkable monomer, for example, diallylamine is preferably used.

The solubility of the second polymerizable monomer in distilled water at 20° C., is preferably 2 g/L or more, more preferably 10 g/L or more, and still more preferably 15 g/L or more, due to the following reasons: it becomes easier for the second polymerizable monomer to be incorporated in the shell of the first precursor particles to accelerate the thermal motion of the shell, and the strength of the hollow particles is increased. The upper limit of the solubility of the second polymerizable monomer in distilled water at 20° C., is not particularly limited, and it is generally 80 g/L or less.

The molecular weight of the second polymerizable monomer is preferably 200 or less, and more preferably 100 or less, from the following points of view: it becomes easier for the second polymerizable monomer to be incorporated in the shell of the first precursor particles to accelerate the thermal motion of the shell; the CTE, relative permittivity and dielectric dissipation factor of the hollow particles are decreased; and the strength of the hollow particles is easily increased. The lower limit of the molecular weight of the second polymerizable monomer is not particularly limited, and it is generally 50 or more.

The amount of the added second polymerizable monomer is preferably from 3 parts by mass to 15 parts by mass, and more preferably from 4 parts by mass to 10 parts by mass, with respect to 100 parts by mass of the first polymerizable monomer. When the amount of the added second polymerizable monomer is equal to or more than the lower limit value, the effect of accelerating the polymerization reaction by the addition of the second polymerizable monomer, is increased, and the crosslinked structure of the shell of the hollow particles is more densified. Accordingly, the CTE, relative permittivity and dielectric dissipation factor of the hollow particles are decreased, and the strength of the hollow particles is increased. On the other hand, when the amount of the added second polymerizable monomer is equal to or less than the upper limit value, a decrease in the content of the first polymerizable monomer with respect to the whole polymerizable monomers used to form the shell, is suppressed. Since the first polymerizable monomer contains a large amount of the crosslinkable monomer, by suppressing a decrease in the content of the first polymerizable monomer, hollow particles which contain many crosslinked structures formed by the crosslinkable monomers and which have excellent strength, are obtained.

In the second polymerization reaction performed after the addition of the second polymerizable monomer, the polymerization system is not particularly limited, and the same polymerization system as the system used in the first polymerization reaction, may be employed.

The polymerization temperature of the second polymerization reaction is preferably from 40° C. to 80° C., and more preferably from 50° C. to 70° C.

The reaction time of the second polymerization reaction is preferably from 1 hour to 6 hours, and more preferably from 2 hours to 4 hours.

By the above-described production method, the amount of the unreacted polymerizable monomer remaining after the second polymerization reaction, can be controlled to preferably 750 ppm or less, more preferably 500 ppm or less, and still more preferably 300 ppm or less.

In the present disclosure, the amount of the unreacted polymerizable monomer remaining after the second polymerization reaction, means the ratio of the mass of the polymerizable monomer remaining unreacted to the mass of the solid component of the hollow particles obtained by the second polymerization reaction. The mass of the unreacted polymerizable monomer can be measured by gas chromatography (GC).

(4) Solid-Liquid Separation Step

The solid-liquid separation step includes performing solid-liquid separation of the second precursor composition, which contains the hollow particles (the second precursor particles) including the hydrocarbon solvent and which is obtained by the above-described polymerization step, to obtain a solid component containing the second precursor particles.

The method of performing the solid-liquid separation of the second precursor composition is not particularly limited, and a known method may be used. Examples of the solid-liquid separation method include a centrifugation method, a filtration method, and still-standing separation. Among them, a centrifugation method or a filtration method may be employed, and from the viewpoint of simplicity of the operation, a centrifugation method may be employed.

Any step such as a preliminary drying step may be performed at a time after the solid-liquid separation step and before performing the solvent removal step described later. Examples of the preliminary drying step include performing preliminary drying on the solid component obtained after the solid-liquid separation step, by use of a drying apparatus such as a dryer and a drying appliance such as a hand dryer.

(5) Solvent Removal Step

The solvent removal step includes removing the hydrocarbon solvent from the hollow particles (the second precursor particles) obtained by the solid-liquid separation step.

By removing the hydrocarbon solvent from the second precursor particles in a gaseous atmosphere, the hydrocarbon solvent in the interior of the second precursor particles is substituted with air, and the hollow particles filled with gas are obtained.

In this step, the term "in a gaseous atmosphere" includes "in an environment where no liquid component exists in the outside of the second precursor particles" and "in an environment where only a very small amount of liquid component at a level that does not influence the removal of the hydrocarbon solvent, exists in the outside of the second precursor particles" in a strict sense. The term "in a gaseous atmosphere" can be reworded as a state where the second precursor particles do not exist in a slurry, or it can be reworded as a state where the second precursor particles exist in a dry powder. That is, in this step, it is important to remove the hydrocarbon solvent in an environment where the second precursor particles come into direct contact with the outside gas.

The method of removing the hydrocarbon solvent from the second precursor particles in a gaseous atmosphere, is not particularly limited, and a known method may be employed. Examples of the method include a reduced pressure drying method, a heat drying method, a flash drying method, and the combination of these methods.

Especially, in the case of using the heat drying method, the heating temperature needs to be set to more than or equal to the boiling point of the hydrocarbon solvent and less than or equal to the highest temperature at which the shell structure of the second precursor particles does not collapse. Accordingly, depending on the composition of the shell and the type of the hydrocarbon solvent in the second precursor particles, the heating temperature may be from 50° C. to 200° C., may be from 70° C. to 200° C., or may be from 100° C. to 200° C., for example.

The hydrocarbon solvent in the interior of the second precursor particles is substituted with the outside gas by the drying operation in the gaseous atmosphere. As a result, the hollow particles in which the hollow portion is occupied by gas, are obtained.

The drying atmosphere is not particularly limited and may be appropriately selected depending on the intended application of the hollow particles. Possible examples of the drying atmosphere include air, oxygen, nitrogen and argon. Further, by filling the interior of the hollow particles with gas once and then performing reduced pressure drying, hollow particles in which the interior is evacuated are also temporarily obtained.

As another method, the hydrocarbon solvent may be removed as follows: the second precursor composition obtained in the polymerization step, which is in the form of slurry, is not subjected to solid-liquid separation and, instead, in the slurry containing the second precursor particles and the aqueous medium, the hydrocarbon solvent included in the second precursor particles is substituted with the aqueous medium of the slurry, thereby removing the hydrocarbon solvent.

In this method, at a temperature equal to or more than the temperature obtained by subtracting 35° C. from the boiling point of the hydrocarbon solvent, an inert gas is bubbled into the second precursor composition. Accordingly, the hydrocarbon solvent can be removed from the second precursor particles.

When the hydrocarbon solvent is a mixed solvent containing several types of hydrocarbon solvents and it has several boiling points, the boiling point of the hydrocarbon solvent in the solvent removal step is determined as the boiling point of the solvent having the highest boiling point among the solvents contained in the mixed solvent, that is, the highest boiling point of the several boiling points.

The temperature at the time of bubbling the inert gas into the second precursor composition, is preferably a temperature equal to or more than the temperature obtained by subtracting 30° C. from the boiling point of the hydrocarbon solvent, and more preferably a temperature equal to or more than the temperature obtained by subtracting 20° C. from the boiling point of the hydrocarbon solvent, from the viewpoint of reducing the amount of the residual hydrocarbon solvent in the hollow particles. The temperature at the time of bubbling is generally set to a temperature equal to or more than the polymerization temperature of the polymerization step. The temperature at the time of bubbling is not particularly limited, and it may be 50° C. or more and 100° C. or less.

The inert gas used for the bubbling is not particularly limited. As the inert gas, examples include, but are not limited to, nitrogen and argon.

Depending on the type and amount of the hydrocarbon solvent, the bubbling condition is appropriately controlled so that the hydrocarbon solvent can be removed from the second precursor particles. The bubbling condition is not particularly limited. For example, the inert gas may be bubbled in an amount of 1 L/min to 3 L/min for 1 hour to 10 hours.

By this method, an aqueous slurry in which the aqueous medium is included in the second precursor particles, is obtained. The slurry is subjected to solid-liquid separation to obtain hollow particles, and the aqueous medium is removed from the hollow particles, thereby obtaining the hollow particles in which the hollow portion is occupied by gas.

The method for obtaining the hollow particles in which the hollow portion is filled with gas, by subjecting the second precursor composition in the form of slurry to solid-liquid separation and then removing the hydrocarbon solvent from the second precursor particles in the gaseous atmosphere, is compared to the method for obtaining the hollow particles in which the hollow portion is filled with gas, by substituting, in the slurry containing the second precursor particles and the aqueous medium, the hydrocarbon solvent included in the second precursor particles with the aqueous medium of the slurry, subjecting the slurry to solid-liquid separation, and then removing the aqueous medium from the second precursor particles in the gaseous atmosphere. As a result, the former method is advantageous in that the hollow particles are less likely to collapse in the hydrocarbon solvent removal step, and the latter method is advantageous in that the amount of the residual hydrocarbon solvent is decreased by bubbling the inert gas.

In the case of substituting the hydrocarbon solvent included in the second precursor particles with water, there is a problem in that obtained hollow resin particles collapse if the same volume of water as the hydrocarbon solvent released from the particles, is not introduced into the particles. For example, a possible means to prevent the problem is thought to be as follows: the pH of the slurry is adjusted to 7 or more; the shell of the particles is swollen with alkali; and then the hydrocarbon solvent is removed from the particles. In this case, the shell of the particles obtains flexibility. Accordingly, the substitution of the hydrocarbon solvent in the interior of the particles with water progresses quickly.

Also, a hydrophobic organic solvent included in the precursor particles may be removed therefrom after the polymerization step and before the solid-liquid separation step, without the solid-liquid separation of the slurry precursor composition obtained in the polymerization step, by use of the following method, for example: evaporating the hydrophobic organic solvent included in the precursor particles from the precursor composition at a predetermined pressure (a high, normal or reduced pressure), or evaporating the hydrophobic organic solvent included in the precursor particles from the precursor composition by introducing water vapor or inert gas such as nitrogen, argon and helium to the precursor composition at a predetermined pressure (a high, normal or reduced pressure).

(6) Others

In addition to the steps (1) to (5) mentioned above, the following washing step (6-a) and the following hollow portion re-substitution step (6-b) may be added, for example.

(6-a) Washing Step

The washing step includes carrying out washing by adding acid or alkali, for removal of the dispersion stabilizer remaining in the second precursor composition containing the second precursor particles before the solid-liquid separation step. When the dispersion stabilizer used is an acid-soluble inorganic dispersion stabilizer, washing is preferably carried out by adding acid to the second precursor composition containing the second precursor particles. When the dispersion stabilizer used is an alkali-soluble inorganic compound, washing is preferably carried out by adding alkali to the second precursor composition containing the second precursor particles.

When the acid-soluble inorganic dispersion stabilizer is used as the dispersion stabilizer, the pH of the second precursor composition is preferably controlled to 6.5 or less, and more preferably 6 or less, by adding acid to the second precursor composition containing the second precursor particles. As the added acid, an inorganic acid such as sulfuric acid, hydrochloric acid and nitric acid or an organic acid such as formic acid and acetic acid may be used. Of them, sulfuric acid is particularly preferred, due to its high dispersion stabilizer removal efficiency and small influence on production equipment.

(6-b) Hollow Portion Re-Substitution Step

The hollow portion re-substitution step includes resubstituting the gas or liquid in the interior of the hollow particles with another gas or liquid. By such substitution, the environment of the interior of the hollow particles can be changed; molecules can be selectively confined in the interior of the hollow particles; or the chemical structure of the interior of the hollow particles can be modified in accordance with the intended application thereof.

3. Applications of the Hollow Particles

The hollow particles of the present disclosure have excellent strength. Due to the excellent strength, the hollow particles of the present disclosure are less likely to collapse when mixed and kneaded with other materials and even when molded after mixing and kneading with other materials. When they are added to a molded body, they exert excellent effects as a weight reducing material, a heat insulation material, an acoustic insulation material, a damping material and so on. Accordingly, the hollow particles of the present disclosure are suitable as an additive for molded body, and they are particularly suitably used as an additive for molded body made of a resin. For example, the hollow particles of the present disclosure can be contained as a filler in a molded body formed by use of a thermoplastic or thermosetting resin and in a molded body formed by use of a material containing a thermoplastic or thermosetting resin and organic or inorganic fibers.

As the applications of the hollow particles of the present disclosure, examples include, but are not limited to, an additive used in members such as a light reflective material, a heat insulation material, a sound insulation material and a low dielectric material, which are used in various kinds of fields such as the automotive field, the electronic field, the electric field, the architecture field, the aviation field and the space field; food containers; footwears such as sports shoes and sandals; components of household appliances; components of bicycles; stationery supplies; tools; and filaments of 3D printers. Due to having low CTE, low relative permittivity and low dielectric dissipation factor, the hollow particles of the present disclosure are particularly preferably used as an additive for resin compositions used in the electronic or electrical field. For example, the hollow particles of the present disclosure are preferably used as a material for electronic circuit boards. More specifically, by incorporating the hollow particles of the present disclosure in the insulation resin layer of an electronic circuit board, the CTE, relative permittivity and relative permittivity of the insulation resin layer can be decreased. Also, the hollow particles of the present disclosure are preferably used as an additive used in materials for semiconductor devices. The materials are used, for example, for interlayer insulation materials, dry film resists, solder resists, bonding wires, magnet wires, semiconductor encapsulating materials, epoxy encapsulating materials, molded underfill materials, underfill materials, die bonding pastes, buffer coating materials, copper-clad laminates, flexible substrates, high frequency device modules, antenna modules and automotive radars. Of them, the hollow particles of the present disclosure are particularly preferably used as an additive used in materials for semiconductor devices, which are used for interlayer insulation materials, solder resists, magnet wires, epoxy encapsulating materials, underfill materials, buffer coating materials, copper-clad laminates, flexible substrates, high frequency device modules, antenna modules or automotive radars.

The hollow particles of the present disclosure have a high void ratio, are less likely to collapse, and have high heat resistance. Accordingly, the hollow particles have heat insulation properties and shock-absorbing properties (cushioning properties) required of an under-coating material, and they also have heat resistance in line with thermal paper uses. Further, the hollow particles of the present disclosure are useful as a plastic pigment that is excellent in gloss, hiding power, etc.

A useful component such as a perfume, a medicine, an agricultural chemical and an ink component can be enclosed in the interior of the hollow particles of the present disclosure by a means such as immersion treatment or depressurized or pressurized immersion treatment. Accordingly, the hollow particles in which such a useful component is enclosed, can be used for various applications in accordance with the component contained in the interior.

4. Resin Composition

The resin composition of the present disclosure contains the hollow particles of the present disclosure and a matrix resin.

In general, the resin composition of the present disclosure is obtained by mixing or kneading the hollow particles of the present disclosure, the matrix resin, and additives which are added as needed. For example, the resin composition may be pellets. In the resin composition containing the hollow particles of the present disclosure, the hollow particles of the present disclosure are less likely to collapse when mixed or kneaded and even when molded thereafter. Accordingly, effects that are produced by the hollow particles, such as weight reduction, a low CTE and a low permittivity, are exerted.

The matrix resin used in the resin composition of the present disclosure is not particularly limited, and it is preferably a thermoplastic or thermosetting resin.

The thermoplastic resin is not particularly limited, and a known thermoplastic resin may be used. As the thermoplastic resin, examples include, but are not limited to, a polyolefin such as polypropylene and polyethylene, a polyamide such as PA6, PA66 and PA12, polyimide, polyamideimide, polyetherimide, polyetherketoneketone, polyvinyl chloride, polystyrene, poly(meth)acrylate, polycarbonate, polyvinylidene fluoride, acrylonitrile-butadiene-styrene copolymer (ABS), acrylonitrile-styrene copolymer (AS), polyphenylene ether, polyphenylene sulfide, polyester, polytetrafluoroethylene, and thermoplastic elastomer.

These thermoplastic resins may be used alone or in combination of two or more.

The thermosetting resin is not particularly limited, and a known thermosetting resin may be used. As the thermosetting resin, examples include, but are not limited to, phenolic resin, melamine resin, urea resin, unsaturated polyester resin, epoxy resin, polyurethane resin, silicone resin, alkyd resin, thermosetting modified polyphenylene ether resin, thermosetting polyimide resin, benzoxazine resin, allyl resin, aniline resin, maleimide resin, bismaleimide triazine resin, liquid crystalline polyester resin, vinyl ester resin, unsaturated polyester resin, cyanate ester resin and polyetherimide resin.

These thermosetting resins may be used alone or in combination of two or more.

The thermosetting resin is preferably used in combination with an additive for curing resin, such as a curing agent and a curing catalyst. As the curing agent and the curing catalyst, conventionally-known agents and catalysts may be used, and they may be appropriately selected depending on the type of the resin. As the additive, examples include, but are not limited to, amines, acid anhydrides, imidazoles, thiols, phenols, naphthols, benzoxazines, cyanate esters, and carbodiimides.

When the resin composition of the present disclosure contains the thermosetting resin, as needed, the resin composition may further contain a solvent for dissolving or dispersing the components, and so on.

In the case of using the resin composition of the present disclosure as materials for electronic circuit board, the matrix resin is preferably an insulation resin.

The insulation resin is not particularly limited. As the insulation resin, examples include, but are not limited to, epoxy resin, thermosetting modified polyphenylene ether resin, thermosetting polyimide resin, silicone resin, benzoxazine resin, melamine resin, urea resin, allyl resin, phenol resin, unsaturated polyester resin, polyurethane resin and aniline resin. Of them, preferred are epoxy resin, thermosetting polyimide resin, modified polyphenylene ether resin, silicone resin, benzoxazine resin and melamine resin. These insulation resins may be used alone or in combination of two or more.

The content of the matrix resin in the total mass (100% by mass) of the resin composition of the present disclosure, is not particularly limited, and it is preferably from 50% by mass to 95% by mass. When the content of the matrix resin is equal to or more than the lower limit value, the resin composition exhibits excellent moldability when molded, and a molded body thus obtained has excellent mechanical properties. On the other hand, when the content of the matrix resin is equal to or less than the upper limit value, the hollow particles of the present disclosure can be sufficiently contained in the resin composition. Accordingly, performances that are produced by the hollow particles of the present disclosure, such as weight reduction, a low CTE and a low permittivity, can be imparted.

In the present disclosure, when the matrix resin is a thermosetting resin, the content of the matrix resin also includes the content of the additive for curing resin, such as a curing agent and a curing catalyst.

The content of the hollow particles of the present disclosure in the total mass (100% by mass) of the resin composition of the present disclosure, is not particularly limited, and it is preferably from 5% by mass to 50% by mass. When the content of the hollow particles is equal to or more than the lower limit value, performances that are produced by the hollow particles of the present disclosure, such as weight reduction, a low CTE and a low permittivity, can be imparted. On the other hand, when the content of the hollow particles is equal to or less than the upper limit value, the matrix resin can be sufficiently contained in the resin composition. Accordingly, the moldability and mechanical strength of the resin composition can be improved.

In addition to the hollow particles of the present disclosure and the matrix resin, the resin composition of the present disclosure may further contain additives such as a UV absorber, a colorant, a thermal stabilizer and a filler, and a solvent and so on, which are added as needed, to the extent that does not impair the effects of the present disclosure.

The resin composition of the present disclosure may further contain organic or inorganic fibers such as carbon fibers, glass fibers, aramid fibers and polyethylene fibers.

For example, the resin composition of the present disclosure is obtained by mixing the hollow particles of the present disclosure, the matrix resin, and the additives, solvent and so on which are added as needed.

When the matrix resin in the resin composition of the present disclosure is the thermoplastic resin, after melting the thermoplastic resin, the melted thermoplastic resin may be mixed with the hollow particles and the additive added as needed, by melt-kneading. The resin composition of the present invention obtained in this manner may be a liquid resin composition, or the resin composition of the present invention may be a resin molded body obtained by forming the liquid resin composition into a molded body by a known method.

The resin composition of the present disclosure may be used as a molded body. Since the molded body of the resin composition of the present disclosure contains the hollow particles of the present disclosure, effects that are produced by the hollow particles of the present disclosure, such as weight reduction, a low CTE and a low permittivity, are effectively exerted.

When the resin composition of the present disclosure is a liquid resin composition which contains the thermoplastic resin as the matrix resin and which is obtained by melting the resin, the molded body can be obtained by molding the liquid resin composition into a desired form by a known molding method, such as extrusion molding, injection molding, press molding and compression molding.

When the resin composition of the present disclosure is a liquid resin composition obtained by incorporating the hollow particles and so on in a liquid matrix resin before curing reaction or is a liquid resin composition obtained by dissolving or dispersing the components in a solvent, the molded body can be obtained by applying the liquid resin composition on a support, drying the applied liquid resin composition as needed, and then curing the dried resin composition.

As the material of the support, examples include, but are not limited to, a resin such as polyethylene terephthalate and polyethylene naphthalate, and a metal such as copper, aluminum, nickel, chromium, gold and silver.

The liquid resin composition can be applied by a known method. As the method, examples include, but are not limited to, dip coating, roll coating, curtain coating, die coating, slit coating and gravure coating.

When the liquid resin composition contains a solvent, the resin composition is preferably dried after the application. The drying temperature is preferably a temperature at which the matrix resin is not cured, and it is generally 20° C. or more and 200° C. or less, and preferably 30° C. or more and 150° C. or less. The drying time is generally 30 seconds or more and 1 hour or less, and preferably 1 minute or more and 30 minutes or less.

The resin composition curing reaction is not particularly limited, and it is performed by a method depending on the type of the matrix resin. When the resin composition contains a heat-curable matrix resin, the heating temperature for curing reaction is not particularly limited, and it is appropriately adjusted depending on the type of the resin. The heating temperature is generally 30° C. or more and 400° C. or less, preferably 70° C. or more and 300° C. or less, and more preferably 100° C. or more and 200° C. or less. The curing time is 5 minutes or more and 5 hours or less, and preferably 30 minutes or more and 3 hours or less. The heating method is not particularly limited. For example, an electric oven may be used.

The matrix resin contained in the liquid resin composition obtained by dissolving or dispersing the components in the solvent, may be a thermosetting or thermoplastic resin.

The form of the molded body is not particularly limited and may be any kind of form that can be formed by use of the resin composition of the present disclosure. The molded body can be in any form such as a sheet form, a film form, a plate form, a tube form, and various kinds of other three-dimensional forms. When the molded body contains fibers, the fibers in the molded body may be in a non-woven fabric form. Also, when the molded body contain fibers, the molded body may be a molded body of a resin composition obtained by adding the hollow particles of the present disclosure to a fiber reinforced plastic containing the resin and fibers as described above.

As the applications of the resin composition of the present disclosure, examples include, but are not limited to, members such as a light reflective material, a heat insulation material, a sound insulation material and a low dielectric material, which are used in various kinds of fields such as the automotive field, the electronic field, the electric field, the architecture field, the aviation field and the space field; food containers; footwears such as sports shoes and sandals; components of household appliances; components of bicycles; stationery supplies; and tools. Due to its low CTE, relative permittivity and dielectric dissipation factor, the resin composition of the present disclosure is preferably used in insulation resin layers that are used in the electric or electronic fields.

EXAMPLES

Hereinbelow, the present disclosure is described more specifically using examples and comparative examples. However, the present disclosure is not limited to these examples. Also, "part (s)" and "%" are on a mass basis unless otherwise specified.

Example 1

(1) Mixture Liquid Preparation Step

First, the following materials were mixed to produce an oil phase.

Ethylene glycol dimethacrylate (80 parts) and pentaerythritol tetraacrylate (20 parts) as the first polymerizable monomers 2,2'-Azobis(2,4-dimethylvaleronitrile) (an oil-soluble polymerization initiator manufactured by Wako Pure Chemical Industries, Ltd., product name: V-65): 3 parts Rosin acid: 0.007 parts Cyclohexane: 120 parts Next, in a stirring tank, under a room temperature condition, an aqueous solution in which 12.1 parts of sodium hydroxide (an alkali metal hydroxide) was dissolved in 121 parts of ion-exchanged water, was gradually added under stirring to an aqueous solution in which 17.1 parts of magnesium chloride (a water-soluble polyvalent metal salt) was dissolved in 494 parts of ion-exchanged water, thereby preparing a magnesium hydroxide colloidal dispersion (a sparingly water-soluble metal hydroxide colloidal dispersion) (magnesium hydroxide: 4 parts). The obtained dispersion was used as an aqueous phase.

The obtained aqueous phase and oil phase were mixed, thereby preparing a mixture liquid.

(2) Suspension Step

The mixture liquid obtained in the mixture liquid preparation step was stirred with a disperser (product name: HOMO MIXER, manufactured by: PRIMIX Corporation) for one minute at a rotational frequency of 4,000 rpm to be suspended, thereby preparing a suspension in which droplets of a monomer composition including cyclohexane, were dispersed in water.

(3) Polymerization Step

In a nitrogen atmosphere, the temperature of the suspension obtained in the suspension step was increased from 40° C. to 65° C. for 30 minutes (temperature increase rate: 50° C./hour), and then the suspension was stirred for one and a half hours in a temperature condition of 65° C., thereby performing the first polymerization reaction. Accordingly, the first precursor composition containing the first precursor particles, was obtained. The polymerization conversion rate at the end of the first polymerization reaction, was 99.2% by mass. Then, as the second polymerizable monomer, 5 parts of methyl acrylate was added to the stirring tank, and in a nitrogen atmosphere, they were stirred for two and a half hours in a temperature condition of 65° C., thereby performing the second polymerization reaction. By the second polymerization reaction, the second precursor composition containing the second precursor particles including cyclohexane, was obtained.

(4) Washing Step and Solid-Liquid Separation Step

The second precursor composition obtained in the polymerization step was washed with dilute sulfuric acid (25° C., 10 minutes) to bring the pH of the composition to 5.5 or less. Next, water was separated therefrom by filtration. Then, 200 parts of ion-exchanged water was added to the resultant to make a slurry again, and a water washing treatment (washing, filtration and dehydration) was repeatedly performed several times at room temperature (25° C.). The resultant was separated by filtration, thereby obtaining a solid component. The obtained solid component was dried with a dryer at a temperature of 40° C., thereby obtaining the second precursor particles including cyclohexane.

(5) Solvent Removal Step

The second precursor particles obtained in the solid-liquid separation step were subjected to heating treatment for 6 hours with a vacuum dryer in a vacuum condition at 200° C., thereby removing the hydrocarbon solvent from the particles. Accordingly, the hollow particles of Example 1 were obtained. From the scanning electron microscopy observation result and void ratio value of the obtained hollow particles, the particles were confirmed to be spherical and to have a hollow portion.

Examples 2, 3 and 8

The hollow particles of Examples 2, 3 and 8 were produced in the same manner as Example 1, except that in the above-mentioned "(3) Polymerization step", the type of the added second polymerizable monomer was changed as shown in Table 1.

Example 4

The hollow particles of Example 4 were produced in the same manner as Example 1, except that in the above-mentioned "(1) Mixture liquid preparation step", the type and amount of the first polymerizable monomer were changed as shown in Table 1.

Examples 5 and 6

The hollow particles of Examples 5 and 6 were produced in the same manner as Example 1, except that in the above-mentioned "(3) Polymerization step", the amount of the second polymerizable monomer added was changed as shown in Table 1.

Example 7

The hollow particles of Example 7 were produced in the same manner as Example 1, except that in the above-mentioned "(1) Mixture liquid preparation step", the type and amount of the first polymerizable monomer and the type and amount of the hydrocarbon solvent were changed as shown in Table 1.

Comparative Example 1

The hollow particles of Comparative Example 1 were produced in the same manner as Example 1, except that in the above-mentioned "(3) Polymerization step", the second polymerizable monomer was not added, and the second polymerization reaction was not performed.

Comparative Example 2

The hollow particles of Comparative Example 2 were produced in the same manner as Example 1, except that in the above-mentioned "(3) Polymerization step", 5 parts of styrene (having a solubility of 0.2 g/L in distilled water at 20° C.) was added as the second polymerizable monomer, in place of 5 parts of the methyl acrylate.

Comparative Example 3

The hollow particles of Comparative Example 3 were produced in the same manner as Example 1, except that in the above-mentioned "(1) Mixture liquid preparation step", the amount of the hydrocarbon solvent was changed as shown in Table 1.

Comparative Example 4

The hollow particles of Comparative Example 4 were produced in the same manner as Example 1, except that in the above-mentioned "(1) Mixture liquid preparation step", the type and amount of the first polymerizable monomer and were changed as shown in Table 1, and in the above-mentioned "(3) Polymerization step", the second polymerizable monomer was not added, and the second polymerization reaction was not performed.

Comparative Example 5

The hollow particles of Comparative Example 5 were produced in the same manner as Example 1, except that in the above-mentioned "(1) Mixture liquid preparation step", the type and amount of the first polymerizable monomer and the type and amount of the hydrocarbon solvent were changed as shown in Table 1, and in the above-mentioned "(3) Polymerization step", the second polymerizable monomer was not added, and the second polymerization reaction was not performed.

TABLE 1

| | | | Example 1 | Example 2 | Example 3 | Example 4 | Example 5 | Example 6 | Example 7 | Example 8 |
|---|---|---|---|---|---|---|---|---|---|---|
| First polymerizable monomer | Non-crosslinkable monomer | Methyl methacrylate (MMA) (Parts) | | | | | | | | |
| | Crosslinkable monomer | Ethylene glycol dimethacrylate (Parts) | 80 | 80 | 80 | 100 | 80 | 80 | | 80 |
| | | Pentaerythritol tetraacrylate (Parts) | 20 | 20 | 20 | | 20 | 20 | | 20 |
| | | Divinylbenzene (Parts) | | | | | | | 100 | |
| Oil-soluble polymerization initiator (Parts) | | | 3 | 3 | 3 | 3 | 3 | 3 | 3 | 3 |
| Hydrocarbon solvent | | Cyclohexane (Parts) | 120 | 120 | 120 | 120 | $ 20 | 120 | | 120 |
| | | Hexane (Parts) | | | | | | | 93 | |
| Additive | | Rosin acid (Parts) | 0.007 | 0.007 | 0.007 | 0.007 | 0.007 | 0.007 | 0.007 | 0.007 |
| Dispersion stabilizer | | Magnesium hydroxide (Parts) | 4 | 4 | 4 | 4 | 4 | 4 | 4 | 4 |
| Ion-exchanged water (Parts) | | | 615 | 615 | 615 | 615 | 615 | 615 | 615 | 615 |
| Polymerization conversion rate (%) when adding the second polymerizable monomer | | | 99.2 | 99.2 | 99.3 | 99.2 | 99.4 | 99.1 | 97.8 | 99.0 |
| Second Polymerizable monomer (added in the second polymerization reaction) | Non-crosslinkable monomer | Methyl acrylate (MA) (Parts) | 5 | | | 5 | 3 | 10 | 5 | |
| | | Acrylonitrile (AN) (Parts) | | 5 | | | | | | |
| | | Methyl methacrylate (MMA) (Parts) | | | 5 | | | | | |
| | | Glycidyl methacrylate (GMA) (Parts) | | | | | | | | 5 |
| | | Styrene (ST) (Parts) | | | | | | | | |
| | Solubility (g/L) in distilled water at 20° C. | | 60 | 70 | 16 | 60 | 60 | 60 | 60 | 50 |

TABLE 1-continued

| | | | Comparative Example 1 | Comparative Example 2 | Comparative Example 3 | Comparative Example 4 | Comparative Example 5 |
|---|---|---|---|---|---|---|---|
| First polymerzable monomer | Non-crosslinkable monomer | Methyl methacrylate (MMA) (Parts) | | | | 5 | |
| | Crosslinkable monomer | Ethylene glycol dimethacrylate (Parts) | 80 | 80 | 80 | 80 | |
| | | Pentaerythritol tetraacrylate (Parts) | 20 | 20 | 20 | 20 | |
| | | Divinylbenzene (Parts) | | | | | 100 |
| Oil-soluble polymerization initiator (Parts) | | | 3 | 3 | 3 | 3 | 3 |
| Hydrocarbon solvent | | Cyclohexane (Parts) | 120 | 120 | 64 | 120 | |
| | | Hexane (Parts) | | | | | 93 |
| Additive | | Rosin acid (Parts) | 0.007 | 0.007 | 0.007 | 0.007 | 0.007 |
| Dispersion stabilizer | | Magnesium hydroxide (Parts) | 4 | 4 | 4 | 4 | 4 |
| Ion-exchanged water (Parts) | | | 615 | 615 | 615 | 615 | 615 |
| Polymerization conversion rate (%) when adding the second polymerizable monomer | | | — | 99.2 | 99.5 | — | — |
| Second Polymerizable monomer (added in the second polymerization reaction) | Non-crosslinkable monomer | Methyl acrylate (MA) (Parts) | | | | 5 | |
| | | Acrylonitrile (AN) (Parts) | | | | | |
| | | Methyl methacrylate (MMA) (Parts) | | | | | |
| | | Glycidyl methacrylate (GMA) (Parts) | | | | | |
| | | Styrene (ST) (Parts) | | | 5 | | |
| | Solubility (g/L) in distilled water at 20° C. | | | 0.2 | 60 | | |

[Evaluation]

1. Polymerization Conversion Rate

From the first precursor composition produced by the first polymerization reaction in the polymerization step of the examples and comparative examples, 50 g of the first precursor composition was taken and subjected to pressure filtration, thereby obtaining the first precursor particles (containing water and the hydrocarbon solvent) contained in the first precursor composition. The obtained first precursor particles were precisely weighed in milligrams. Next, 27 g of ethyl acetate was added to about 3 g of the precisely weighed first precursor particles, and they were stirred for 15 minutes. Then, 13 g of methanol was added thereto, and they were mixed for 10 minutes. A solution thus obtained was left to stand to deposit an insoluble component, and the supernatant of the solution was collected as a measurement sample. Next, 2 µL of the measurement sample was injected into a gas chromatograph, and the amount of the polymerizable monomer in the measurement sample was quantified by gas chromatography (GC) in the following condition. The quantified amount was regarded as the mass of the unreacted first polymerizable monomer. Also, the first precursor particles obtained by the pressure filtration were dried at 200° C. for two hours for removal of the water and the hydrocarbon solvent, and the mass of the solid component of the first precursor particles was obtained. Then, the polymerization conversion rate was calculated by the following formula (A).

Polymerization conversion rate (% by mass)=100−(Mass of the unreacted first polymerizable monomer/Mass of the solid component of the first precursor particles)×100    Formula(A)

<Condition of GC>
Column: TC-WAX (0.25 mm×30 m)
Column temperature: 80° C.
Injection temperature: 200° C.
FID detection side temperature: 200° C.

For the hollow particles obtained in the examples and the comparative examples, Table 2 shows the content (% by mass) of each monomer unit in the polymer contained in the shell.

The hollow particles obtained in the examples and the comparative examples were measured and evaluated as follows. The results are shown in Table 2.

2. Volume Average Particle Diameter of Hollow Particles

The particle diameter of each hollow particle was measured using a laser diffraction particle size distribution measuring apparatus (product name: SALD-2000, manufactured by: Shimadzu Corporation), and the volume average of the particle diameters was calculated and used as the volume average particle diameter.

3. Density and Void Ratio of Hollow Particles 3-1. Measurement of Apparent Density of Hollow Particles First, approximately 30 cm³ of the hollow particles were introduced into a measuring flask with a volume of 100 cm³, and the mass of the introduced hollow particles was precisely weighed. Next, the measuring flask in which the hollow particles were introduced, was precisely filled with isopropanol up to the marked line while care was taken so that air bubbles did not get in. The mass of the isopropanol added to the measuring flask was precisely weighed, and the apparent density $D_1$ (g/cm³) of the hollow particles was calculated by the following formula (I).

Apparent density $D_1$=[Mass of the hollow particles]/(100−[Mass of the isopropanol]/[Specific gravity of the isopropanol at the measuring temperature])    Formula (I)

3-2. Measurement of True Density of Hollow Particles

The hollow particles were pulverized in advance; approximately 10 g of the pulverized hollow particles were introduced into a measuring flask with a volume of 100 cm³; and the mass of the introduced pulverized particles was precisely weighed.

Then, similarly to the measurement of the apparent density mentioned above, isopropanol was added to the measuring flask; the mass of the isopropanol was precisely weighed; and the true density $D_0$ (g/cm³) of the hollow particles was calculated by the following formula (II).

True density $D_1$=[Mass of the pulverized hollow particles]/(100−[Mass of the isopropanol]/[Specific gravity of the isopropanol at the measuring temperature])  Formula (II)

3-3. Calculation of Void Ratio

The void ratio of the hollow particles was calculated by the following formula (III) from the apparent density $D_1$ and the true density $D_0$.

Void ratio (%)=100−(Apparent density$D_1$/True density$D_0$)×100  Formula (III)

4. Shell thickness of hollow particles

The inner diameter r of the hollow particles was calculated by the following formula (1) using the volume average particle diameter R and void ratio of the hollow particles, and the shell thickness of the hollow particles was calculated by the following formula (2) using the inner diameter r and the volume average particle diameter R.

$4/3\pi \times (R/2)^3 \times$ Void ratio=$4/3\pi \times (r/2)^3$  Formula (1)

Shell thickness=$(R−r)/2$  Formula (2)

5. Immersion Test

In an environment at 25° C., 0.1 mg of the hollow particles were added to 4 mL of acetone, and a mixture thus obtained was shaken for 10 minutes at a shaking rate of 100 rpm by use of a shaking device and then left to stand for 48 hours. Then, the ratio of the hollow particles thus submerged was obtained and evaluated according to the following evaluation criteria. The hollow particles submerged in the acetone were separated by a centrifuge, and the separated hollow particles were dried. Then, the mass of the hollow particles submerged in the acetone was measured. The ratio of the mass of the hollow particles submerged in the acetone to the mass of the whole hollow particles immersed in the acetone, was calculated, thereby obtaining the ratio of the hollow particles submerged.

(Evaluation Criteria of the Immersion Test)

○: Less than 10% by mass of the hollow particles submerged.

x: 10% by mass or more of the hollow particles submerged.

6. Thermal Expansion Coefficient

6-1. Production of Molded Plate for Measurement

First, 50 parts of epoxy resin (manufactured by Daicel Corporation, product name: EHPE3150CE), 24.9 parts of a curing agent (manufactured by DIC Corporation, product name: LF6161), 0.1 parts of 2-ethyl-4-methylimidazole (2E4MZ, manufactured by Nacalai Tesque, Inc.) as a curing catalyst, and 26 parts of methyl ethyl ketone (MEK) were mixed. The mixture was stirred for 30 minutes. After stirring the mixture, 16.6 parts of the hollow particles were added to the mixture, and the mixture was further stirred for one hour, thereby producing a varnish. Next, 15 g of the varnish was placed on a copper foil and defoamed with a vacuum dryer at 130° C. until no bubble was formed. Then, the defoamed varnish was cured in a hot air circulation oven at 110° C. for two hours. By use of a pressing machine, the heat-pressing of the cured product of the varnish was started at 110° C. and a pressure of 0.5 MPa, then the temperature was increased to 205° C. (4° C./min) and kept for one hour, thereby producing a molded plate. The molded plate was cut into a size of 20 mm×40 mm×0.5 mm, thereby obtaining a measurement sample.

6-2. Measurement of Thermal Expansion Coefficient of Hollow Particles

In accordance with JIS K 7197:2012, using a TMA device (manufactured by Rigaku Corporation, model: TMA-8311), the thermal expansion coefficient of the produced molded plate in a range of from 25° C. to 250° C. was measured in tensile mode.

The thermal expansion coefficient $\alpha_p$ of the hollow particles in a temperature range of from 80° C. to 200° C. and that of the hollow particles in a temperature range of from 25° C. to 80° C., were calculated by the following formula (E):

$\alpha_p = (\alpha_c - SG_r \times \alpha_r)/W_p$  Formula (E)

(where $\alpha_c$ is the thermal expansion coefficient of the molded plate; $\alpha_r$ is the thermal expansion coefficient of the epoxy resin alone; $SG_r$ is the volume ratio of the epoxy resin in the molded plate; and $W_p$ is the volume ratio of the hollow particles in the molded plate.)

The thermal expansion coefficient (CTE) value is a value obtained by multiplying the value shown in Table 2 by $10^{-5}$.

7. Measurement of Relative Permittivity and Dielectric Dissipation Factor

Using a perturbation-type measuring device (manufactured by: AET Inc., model: ADMS01Nc), the relative permittivity and dielectric dissipation factor of the hollow particles were measured at a frequency of 1 GHz and at room temperature (25° C.).

TABLE 2

| | | Example 1 | Example 2 | Example 3 | Example 4 | Example 5 | Example 6 | Example 7 | Example 8 |
|---|---|---|---|---|---|---|---|---|---|
| Crosslinkable monomer unit (% by mass) | Ethylene glycol dimethacrylate | 76.2 | 76.2 | 76.2 | 95.2 | 77.7 | 72.7 | | 76.2 |
| | Pentaerythritol tetraacrylate | 19.0 | 19.0 | 19.0 | | 19.4 | 18.2 | | 19.0 |
| | Divinylbenzene | | | | | | | 95.2 | |
| Non-crosslinkable monomer unit (% by mass) | Methyl acrylate (MA) | 4.8 | | | 4.8 | 2.9 | 9.1 | 4.8 | |
| | Acrylonitrile (AN) | | 4.8 | | | | | | |
| | Methyl methacrylate (MMA) | | | 4.8 | | | | | |
| | Glycidyl methacrylate (GMA) | | | | | | | | 4.8 |
| | Styrene (ST) | | | | | | | | |

TABLE 2-continued

| | | | | | | | | | |
|---|---|---|---|---|---|---|---|---|---|
| Properties of hollow particles | Volume average particle diameter (μm) | 9.5 | 8.7 | 9.6 | 9.8 | 9.5 | 9.4 | 10.2 | 8.7 |
| | Apparent density $D_1$ (g/cm³) | 0.42 | 0.42 | 0.42 | 0.42 | 0.42 | 0.42 | 0.42 | 0.42 |
| | True density $D_0$ (g/cm³) | 1.20 | 1.20 | 1.20 | 1.20 | 1.20 | 1.20 | 1.20 | 1.20 |
| | Void ratio (%) | 65 | 65 | 65 | 65 | 65 | 65 | 65 | 65 |
| | Shell thickness (μm) | 0.64 | 0.58 | 0.64 | 0.66 | 0.64 | 0.63 | 0.68 | 0.58 |
| | Immersion test | ○ | ○ | ○ | ○ | ○ | ○ | ○ | ○ |
| | CTE (×10⁻⁵/° C.) at 80° C. to 200° C. | 9.3 | 9.3 | 9.8 | 9.6 | 9.8 | 9.9 | 9.0 | 9.9 |
| | CTE (×10⁻⁵/° C.) at 25° C. to 80° C. | 5.4 | 5.5 | 5.9 | 5.6 | 5.8 | 5.9 | 5.2 | 5.9 |
| | Relative permittivity | 1.5 | 1.5 | 1.6 | 1.5 | 1.6 | 1.5 | 1.5 | 1.6 |
| | Dielectric dissipation factor | 0.009 | 0.009 | 0.009 | 0.009 | 0.009 | 0.008 | 0.006 | 0.009 |

| | | Comparative Example 1 | Comparative Example 2 | Comparative Example 3 | Comparative Example 4 | Comparative Example 5 |
|---|---|---|---|---|---|---|
| Crosslinkable monomer unit (% by mass) | Ethylene glycol dimethacrylate | 80 | 76.2 | 76.2 | 76.2 | |
| | Pentaerythritol tetraacrylate | 20 | 19.0 | 19.0 | 19.0 | |
| | Divinylbenzene | | | | | 100 |
| Non-crosslinkable monomer unit (% by mass) | Methyl acrylate (MA) | | | 4.8 | | |
| | Acrylonitrile (AN) | | | | | |
| | Methyl methacrylate (MMA) | | | | 4.8 | |
| | Glycidyl methacrylate (GMA) | | | | | |
| | Styrene (ST) | | 4.8 | | | |
| Properties of hollow particles | Volume average particle diameter (μm) | 9.2 | 9.5 | 9.3 | 9.5 | 10.3 |
| | Apparent density $D_1$ (g/cm³) | 0.42 | 0.42 | 0.66 | 0.42 | 0.42 |
| | True density $D_0$ (g/cm³) | 1.20 | 1.20 | 1.20 | 1.20 | 1.20 |
| | Void ratio (%) | 65 | 65 | 45 | 65 | 65 |
| | Shell thickness (μm) | 0.62 | 0.64 | 0.62 | 0.64 | 0.69 |
| | Immersion test | x | x | ○ | x | x |
| | CTE (×10⁻⁵/° C.) at 80° C. to 200° C. | 11.3 | 12.5 | 13.3 | 11.1 | 10.4 |
| | CTE (×10⁻⁵/° C.) at 25° C. to 80° C. | 6.3 | 6.3 | 7.0 | 6.4 | 6.1 |
| | Relative permittivity | 1.7 | 1.7 | 1.8 | 1.7 | 1.6 |
| | Dielectric dissipation factor | 0.012 | 0.012 | 0.013 | 0.013 | 0.009 |

[Consideration]

As for the hollow particles obtained in the comparative examples, as shown in Table 2, the CTE at 80° C. to 200° C. and the CTE at 25° C. to 80° C. were high, and the relative permittivity and dielectric dissipation factor at a frequency of 1 GHz were high, comparing each comparative example with the examples in which the same type of crosslinkable monomer(s) was used.

As for the hollow particles obtained in Comparative Examples 1, 2, 4 and 5, it is presumed that since 10% by mass or more of the hollow particles submerged in the acetone in the immersion test and since the density of the shell was insufficient, the CTE, relative permittivity and dielectric dissipation factor of the hollow particles were not sufficiently decreased.

In Comparative Examples 1 and 5, it is presumed that since the second polymerizable monomer was not added, the density of the shell became insufficient.

In Comparative Example 2, it is presumed that since the styrene having a solubility of 0.2 g/L in distilled water at 20° C., was used as the second polymerizable monomer in place of the hydrophilic monomer having a solubility of 0.3 g/L or more in distilled water at 20° C., the density of the shell became insufficient.

In Comparative Example 4, it is presumed that since the methyl methacrylate was not added as the second polymerizable monomer and was added to the mixture liquid in one step along with the first polymerizable monomer and the polymerization reaction was performed in one step, the density of the shell became insufficient.

In Comparative Example 3, it is presumed that since the void ratio of the hollow particles obtained in Comparative Example 3 was low and since the size of the hollow portion was insufficient, the CTE, relative permittivity and dielectric dissipation factor of the hollow particles were not sufficiently decreased.

As for the hollow particles obtained in the examples, the CTE at 80° C. to 200° C. and the CTE at 25° C. to 80° C. were low, and the relative permittivity and dielectric dissipation factor at a frequency of 1 GHz were also low.

The reasons for the decrease in the CTE, relative permittivity and dielectric dissipation factor of the hollow particles obtained in Examples 1 to 8, are presumed as follows: since the void ratio was 50% or more, the percentage of the hollow portion in the particles was sufficiently large, that is, the percentage of the shell in the particles was sufficiently decreased; the shell contained the polymer in which from 70 parts by mass to 100 parts by mass of a crosslinkable monomer unit was contained in 100 parts by mass of all monomer units; and the hollow particles had such a dense structure that less than 10% by mass of the hollow particles submerged in the acetone in the hollow particle immersion test.

REFERENCE SIGNS LIST

1. Aqueous medium
2. Low polarity material

3. Dispersion stabilizer
4. Monomer composition
4a. Hydrocarbon solvent
4b. Material not containing hydrocarbon solvent
4c. Polymerizable monomer dispersed in aqueous medium
5. Oil-soluble polymerization initiator
6. Shell
8. Hollow portion
10. Droplet
20. Hollow particle including hydrocarbon solvent in the hollow portion (the second precursor particle)
100. Hollow particle having a hollow portion filled with gas

The invention claimed is:

1. Hollow particles which comprise a shell containing a resin and a hollow portion surrounded by the shell,
wherein a void ratio is 50% or more;
wherein a volume average particle diameter is 1.0 μm or more;
wherein the shell contains, as the resin, a polymer in which from 70 parts by mass to 98 parts by mass of a crosslinkable monomer unit is contained in 100 parts by mass of all monomer units;
wherein the crosslinkable monomer unit comprises at least one selected from a bifunctional crosslinkable monomer unit derived from a bifunctional crosslinkable monomer and a trifunctional or higher-functional crosslinkable monomer unit derived from a trifunctional or higher-functional crosslinkable monomer;
wherein the polymer contained in the shell further contains a hydrophilic non-crosslinkable monomer unit derived from a hydrophilic non-crosslinkable monomer having a solubility of 0.3 g/L or more in distilled water at 20° C., and a content of the hydrophilic non-crosslinkable monomer unit is from 2 parts by mass to 15 parts by mass in 100 parts by mass of all monomer units of the polymer,
wherein a thermal expansion coefficient of the hollow particles at 80° C. to 200° C. is $10.0 \times 10^{-5}$/° C. or less; and
wherein, in a hollow particle immersion test in which a mixture obtained by adding 0.1 mg of the hollow particles to 4 mL of acetone and shaking them for 10 minutes at a shaking rate of 100 rpm, is left to stand for 48 hours in an environment at 25° C., less than 10% by mass of the hollow particles submerge in the acetone.

2. The hollow particles according to claim 1, wherein a thermal expansion coefficient of the hollow particles at 25° C. to 80° C. is $6.0 \times 10^{-5}$/° C. or less.

3. The hollow particles according to claim 1, wherein a relative permittivity of the hollow particles at a frequency of 1 GHz is 1.6 or less.

4. The hollow particles according to claim 1, wherein a dielectric dissipation factor of the hollow particles at a frequency of 1 GHz is 0.010 or less.

5. The hollow particles according to claim 1,
wherein the crosslinkable monomer unit comprises the bifunctional crosslinkable monomer unit, and
wherein a content of the bifunctional crosslinkable monomer unit in 100 parts by mass of all monomer units of the polymer, is from 70 parts by mass to 98 parts by mass.

6. The hollow particles according to claim 1,
wherein the crosslinkable monomer unit comprises the bifunctional crosslinkable monomer unit and the trifunctional or higher-functional crosslinkable monomer unit, and
wherein a content of the trifunctional or higher-functional crosslinkable monomer unit in 100 parts by mass of all monomer units of the polymer, is from 5 parts by mass to 50 parts by mass.

7. The hollow particles according to claim 1, wherein the crosslinkable monomer unit contains a crosslinkable monomer unit derived from a (meth)acrylic crosslinkable monomer containing, as a polymerizable functional group, a (meth)acryloyl group.

* * * * *